US007835355B2

(12) United States Patent
Miyata

(10) Patent No.: US 7,835,355 B2
(45) Date of Patent: Nov. 16, 2010

(54) PACKET FORWARDING APPARATUS HAVING GATEWAY SELECTING FUNCTION

(75) Inventor: Hiroaki Miyata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 509 days.

(21) Appl. No.: 11/755,264

(22) Filed: May 30, 2007

(65) Prior Publication Data

US 2007/0286217 A1 Dec. 13, 2007

(30) Foreign Application Priority Data

Jun. 12, 2006 (JP) ............................. 2006-162074

(51) Int. Cl.
H04L 12/56 (2006.01)
(52) U.S. Cl. ......................................... 370/389; 726/3
(58) Field of Classification Search ....................... None
See application file for complete search history.

(56) References Cited

U.S. PATENT DOCUMENTS

| 5,974,452 | A  | * | 10/1999 | Karapetkov et al. | .......... 709/218 |
| 6,219,706 | B1 | * | 4/2001  | Fan et al. | ..................... 709/232 |
| 6,545,982 | B1 | * | 4/2003  | Murthy et al. | .............. 370/401 |
| 6,775,367 | B1 | * | 8/2004  | Lehtinen | ..................... 709/202 |
| 6,947,428 | B1 | * | 9/2005  | Andersson et al. | .......... 370/401 |
| 2002/0021659 | A1 | * | 2/2002 | Meijen et al. | ................ 370/217 |
| 2005/0073964 | A1 | * | 4/2005 | Schmidt et al. | ............. 370/260 |
| 2006/0056422 | A1 | * | 3/2006 | Berkvens | ..................... 370/401 |
| 2006/0085849 | A1 | * | 4/2006 | Culbert | ......................... 726/13 |
| 2007/0044142 | A1 | * | 2/2007 | Yoon et al. | ...................... 726/3 |
| 2007/0101414 | A1 | * | 5/2007 | Wing et al. | .................... 726/5 |
| 2007/0263538 | A1 | * | 11/2007 | Hueck et al. | ................. 370/232 |

FOREIGN PATENT DOCUMENTS

| JP | 2004-158977 | 6/2004 |
| WO | WO 2005069562 A1 * | 7/2005 |

OTHER PUBLICATIONS

RFC2284, L. Bunk, et al. Mar. 1998, pp. 1-12.
RFC2516, L. Mamakos, et al. Feb. 1999, pp. 1-13.
IEEE Std 802.1X-2001, Port-Based Network Access Control, 2001.

* cited by examiner

*Primary Examiner*—Chirag G Shah
*Assistant Examiner*—Joshua Smith
(74) *Attorney, Agent, or Firm*—Mattingly & Malur, P.C.

(57) ABSTRACT

Packet forwarding apparatus comprises a plurality of line interfaces and a protocol processing unit for controlling packet forwarding among the line interfaces and for forwarding a connection initiation request packet received from a user terminal to a plurality of redundant gateways, wherein the protocol processing unit has a management table for storing forwarding control information to control forwarding of communication control packets for each user terminal, selectively forwards one of response packets replied from the plurality of gateways in response to the connection initiation request packet to the requester user terminal and discards the other response packets based on the forwarding control information.

10 Claims, 17 Drawing Sheets

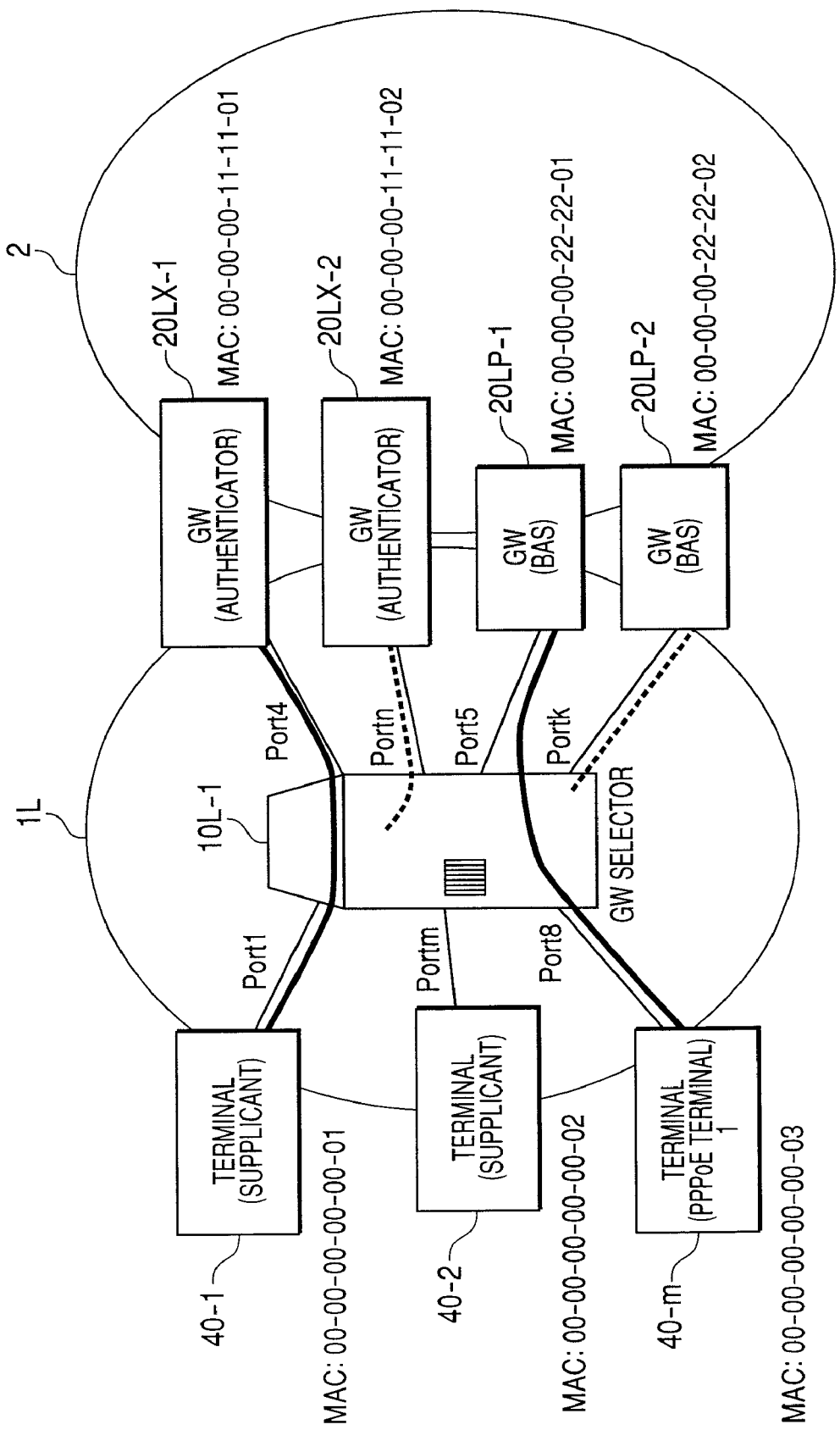

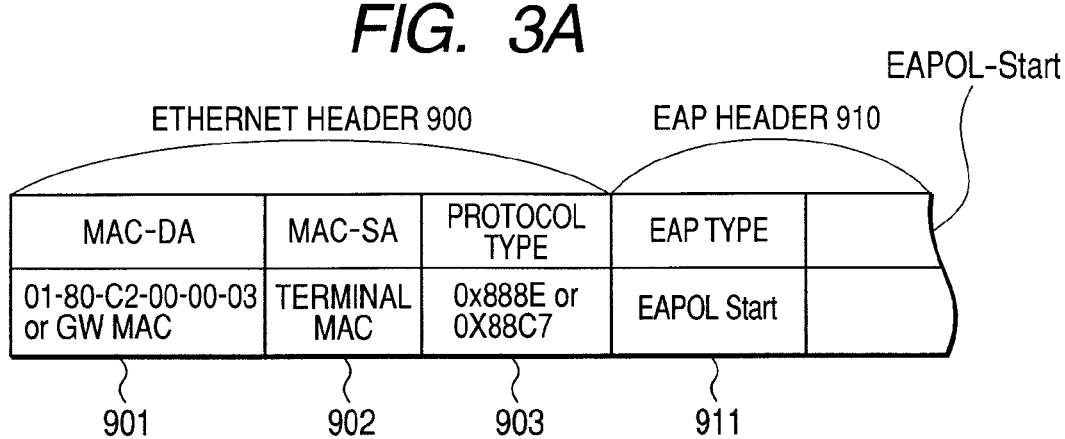
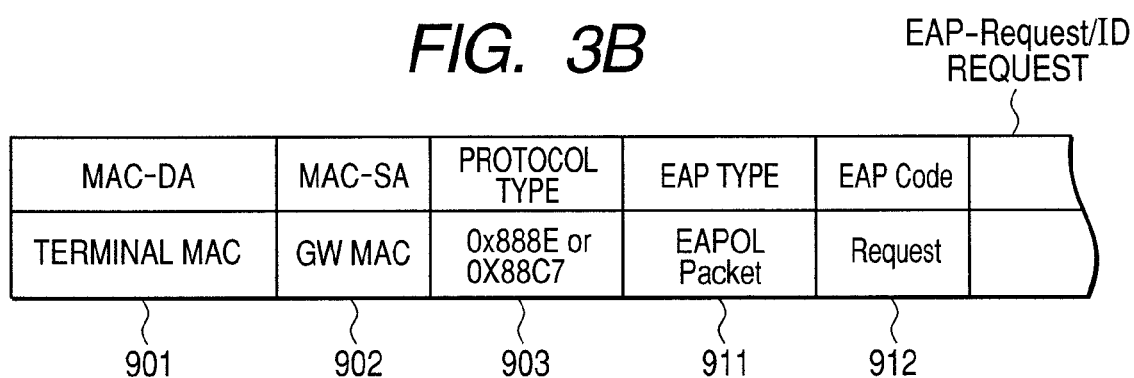
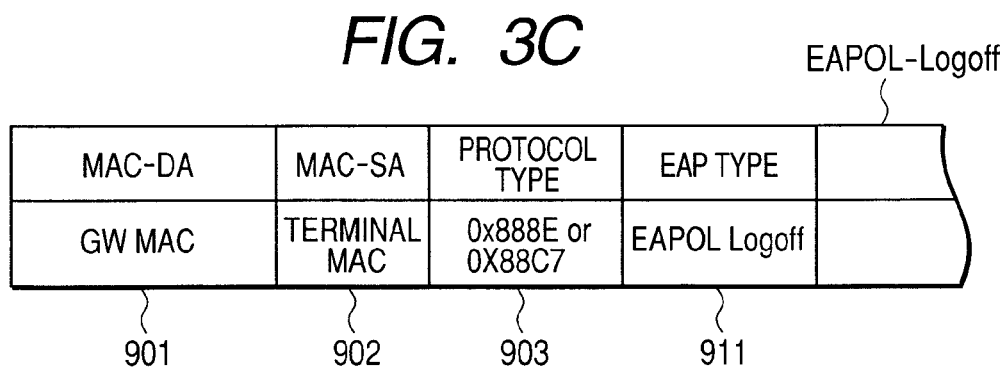

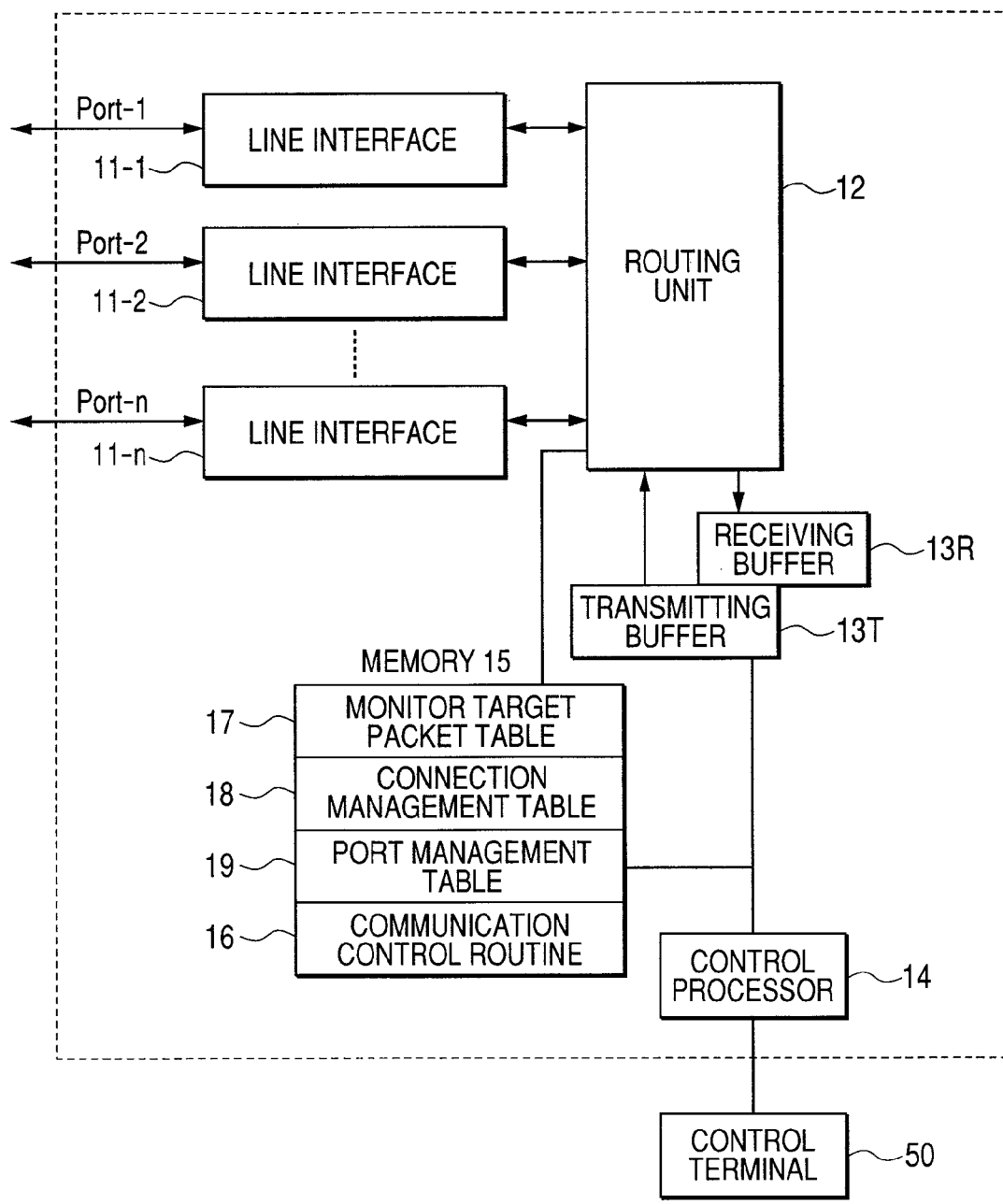

FIG. 6A

CONNECTION MANAGEMENT TABLE 18

| TERMINAL PORT | TERMINAL MAC | GW PORT | GW MAC | STATUS | TIMER VALUE (s) |
|---|---|---|---|---|---|
| m | 00-00-00-00-00-02 | 4 | 00-00-00-11-11-01 | EAP FORWARDING | 24 |
| 1 | 00-00-00-00-00-01 | — | — | EAP Request/ID REQUEST WAITING | 600 |
| | | | | | |
| | | | | | |

| TERMINAL PORT | TERMINAL MAC | GW PORT | GW MAC | STATUS | TIMER VALUE (s) |
|---|---|---|---|---|---|
| m | 00-00-00-00-00-02 | 4 | 00-00-00-11-11-01 | EAP FORWARDING | 22 |
| 1 | 00-00-00-00-00-01 | 4 | 00-00-00-11-11-01 | EAP FORWARDING | 600 |
| | | | | | |
| | | | | | |

FIG. 6C

| TERMINAL PORT | TERMINAL MAC | GW PORT | GW MAC | STATUS | TIMER VALUE (s) |
|---|---|---|---|---|---|
| 1 | 00-00-00-00-00-01 | 4 | 00-00-00-11-11-01 | EAP FORWARDING | 320 |
| | | | | | |
| | | | | | |
| | | | | | |

FIG. 7
PORT MANAGEMENT TABLE 19

| PORT No. | GW CONNECTION FLAG | MAC ADDRESS |
|---|---|---|
| 1 | 0 | 00-00-00-00-00-01 ⋮ |
| ⋮ | ⋮ | ⋮ |
| 4 | 1 | 00-00-00-11-11-01 ⋮ |
| 5 | 1 | 00-00-00-22-22-01 ⋮ |
| ⋮ | ⋮ | ⋮ |
| 8 | 0 | 00-00-00-00-00-03 ⋮ |
| ⋮ | ⋮ | ⋮ |
| m | 0 | 00-00-00-00-00-02 ⋮ |
| ⋮ | ⋮ | ⋮ |
| n | 1 | 00-00-00-11-11-02 ⋮ |
| ⋮ | ⋮ | ⋮ |
| k | 1 | 00-00-00-22-22-02 ⋮ |
| ⋮ | ⋮ | ⋮ |

191    192    193

FIG. 17A
CONNECTION MANAGEMENT TABLE 18

| TERMINAL PORT (181) | TERMINAL MAC (182) | GW PORT (183) | GW MAC (184) | STATUS (185) | TIMER VALUE (s) (186) |
|---|---|---|---|---|---|
| 8 | 00-00-00-00-00-03 | — | — | PADO WAITING | 600 |
| | | | | | |
| | | | | | |
| | | | | | |

FIG. 17B

| TERMINAL PORT | TERMINAL MAC | GW PORT | GW MAC | STATUS | TIMER VALUE (s) |
|---|---|---|---|---|---|
| 8 | 00-00-00-00-00-03 | 5 | 00-00-00-22-22-01 | PADS WAITING | 600 |
| | | | | | |
| | | | | | |
| | | | | | |

FIG. 17C

| TERMINAL PORT | TERMINAL MAC | GW PORT | GW MAC | STATUS | TIMER VALUE (s) |
|---|---|---|---|---|---|
| 8 | 00-00-00-00-00-03 | 5 | 00-00-00-22-22-01 | 10 | 600 |
| | | | | | |
| | | | | | |
| | | | | | |

PACKET FORWARDING APPARATUS HAVING GATEWAY SELECTING FUNCTION

CLAIM OF PRIORITY

The present application claims priority from Japanese patent application serial No. 2006-162074, filed on Jun. 12, 2006, the content of which is hereby incorporated by reference into this application.

BACKGROUND OF THE INVENTION (1) Field of the Invention

The present invention relates to a packet forwarding apparatus forming an Internet access network. More particularly, the invention relates to a packet forwarding apparatus having a function of selecting one of gateways connected to an Internet transit network and connecting a user terminal to the Internet transit network via the selected gateway.

(2) Description of Related Art

Nowadays, an authentication-based high-speed Internet connection service is provided. In this connection service, a user terminal is connected to an authentication server via a high-speed access line such as an Asymmetric Digital Subscriber Line (ADSL), Fiber to The Home (FTTH), or wireless LAN, and the user terminal is connected to the Internet when succeeded in authentication.

In the authentication-based high-speed Internet connection service, each user terminal is connected to a transit network managed by an Internet Services Provider (ISP) via, for example, a gateway node such as a Broadband Access Server (BAS) that terminates a high-speed access network. If the user terminal is a PPPoE terminal for Point to Point Protocol over Ethernet (PPPoE) prescribed in RFC 2516, the BAS terminates PPPoE or PPP, a protocol for connecting with the user terminal, and forwards layer-3 packets to the transit network.

In addition to the above layer-3 Internet connection service, an authentication-base connection service at a layer-2 level is also provided in recent years. In the layer-2 level authentication-base connection service, user authentication is carried out in accordance with a PPP Extensible Authentication Protocol (EAP) in IEEE 802.1X prescribed in RFC 2284. In this case, the transit network is comprised of Ethernet. In the EAP, user authentication is performed by communicating EAP over LAN (EAPOL) packets between a supplicant which is a user terminal to be an authentication requester and an authenticator which is a gateway node to be an authentication executor. The authenticator forwards each packet transmitted from an authenticated user terminal to the transit network by layer-2 packet forwarding.

In the layer-2 Internet connection service using the IEEE 802.1X, each user terminal (supplicant) sends an IP address request to a Dynamic Host Configuration Protocol (DHCP) server which is managed by an ISP and receives an IP address assigned, for example, in an EAP forwarding phase which is executed after the completion of an EAP authentication phase. Because IEEE 802.1X fundamentally assumes to connect each supplicant with an authenticator in a one-to-one connection manner, the authenticator has to be provided with a plurality of connection ports as many as the number of supplicants it serves. However, in a case where a plurality of supplicants (user terminals) are connected to the authenticator via a L2SW, the authenticator can communicate with the plurality of supplicants through one connection port if a special multicast MAC address ("01-80-C2-00-00-03") is applied to each EAPOL packet and the L2SW can pass the multicast EAPOL packet to the authenticator.

In order to provide an IP telephone service to each user terminal via the transit network, it is required to enhance the communication performance of the access network and the transit network up to a level comparable to that of an existing telephone network. In a network for layer-3 connection using PPPoE, it is possible to adopt an access network of redundant BASs configuration in which a plurality of BASs connectable with user terminals are prepared so that a service disruption can recover quickly even if a BAS serving a number of user terminals has failed.

In the network of the redundant BASs configuration, a plurality of BASs reply response packets called a PPPoE Active Discovery Offer (PADO) in response to a PPPoE Active Discovery Initiation (PADI) packet broadcasted from a PPPoE terminal, the PPPoE terminal selects one of the BASs that reply the PADO packets and executes a succeeding communication control procedure starting from transmission of a PPPoE Active Discovery Request (PADR) packet with the selected BAS.

However, since the selection of BAS by the PPPoE terminal depends on the reception timing of each of PADO packets or a BAS selection algorithm implemented on the PPPoE terminal, it is unable to control load distribution among the BASs from ISP or telecommunications carrier side. Therefore, it is impossible for the ISP to manage the BASs in such a manner that, for example, one of two redundant BASs operates as active and the other as standby, or PPPoE terminals are selectively connected to the BASs so as to balance out the loads on the two BASs.

As a prior art, for example, Japanese Patent Publication No. 2004-158977 proposes a load distribution processing system adapted such that a load distributing apparatus connected to a plurality of Web servers receives an access request from a user terminal and selects one of Web servers to which the user terminal should be connected. According to this system, however, if a Web server selected by the load distributing apparatus has failed, no response to an access request is transmitted to a requester terminal, despite that there exist the other normal Web servers in a network. For this reason, the user terminal has to transmit the access request packet again by detecting the time over for waiting the response. It takes extra time for Web access.

On the other hand, in the layer-2 connection service in accordance with IEEE 802.1X, an authenticator can serve a plurality of supplicants by the intervention of an L2SW for passing EAPOL packets to the authenticator. In this case, when a supplicant multicasts a connection initiation request packet (EAPOL-Start), a plurality of authenticators will response to the request. However, because one-to-one connection is fundamentally assumed between a supplicant and a authenticator in IEEE 802.1X, each supplicant of IEEE 802.1X that transmitted the EAPOL-Start packet expects to receive one response packet (EAP-Request/ID Request) at a next step of a communication control procedure. Therefore, if a plurality of EAP-Request/ID Request packets are replied from authenticators in response to the same EAPOL-Start packet, how the supplicant operates in response to the second arrived EAP-Request/ID Request packet depends on the software implemented on the supplicant. If the supplicant repeats the same operation in response to all EAP-Request/ID Request packets, the supplicant has a possibility of failing in connecting to the Internet due to confusion of communication control procedures carried out with the plurality of authenticators.

SUMMARY OF THE INVENTION

An object of the present invention is to provide a packet forwarding apparatus adapted to enable correct execution of a communication control procedure between a user terminal and an Internet transit network without depending on software implemented on the user terminal, in a network topology in which an access network and the Internet transit network are connected by a plurality of redundant gateways, such as BASs and authenticators.

In order to achieve the above object, a packet forwarding apparatus of the present invention comprises: a plurality of line interfaces each for communicating with one of user terminals or one of redundant gateways; and a protocol processing unit for controlling packet forwarding among the line interfaces and for forwarding, upon receiving a connection initiation request packet transmitted from one of the user terminals to connect the user terminal to an Internet transit network, the connection initiation request packet to the plurality of gateways, wherein the protocol processing unit has a management table for storing forwarding control information to control forwarding of communication control packets for each user terminal, selects one of response packets replied from the plurality of gateways in response to the connection initiation request packet transmitted from the user terminal, forwards the selected response packet to the user terminal, and discards the other response packets based on the forwarding control information corresponding to the user terminal indicated by the management table.

Here, if the user terminal is a PPPoE terminal, for example, the connection initiation request packet is a PADI packet and the response packets from the gateways (BASs) are PADO packets. By selectively forwarding one of PADO packets to the PPPoE terminal, the packet forwarding apparatus operates thereafter to forward PPPoE packets between the user terminal and a gateway which is the source of the selected PADO packet.

Alternatively, if the user terminal is a supplicant terminal in IEEE 802.1X, for example, the connection initiation request packet is an EAPOL-Start packet and the response packets from the gateways (authenticators) are EAP-Request/ID Request packets. By selectively forwarding one of EAP-Request/ID Request packets to the supplicant, the packet forwarding apparatus operates thereafter to forward EAPOL packets and Ethernet frames between the user terminal and a gateway which is the source of the selected EAP-Request/ID Request packet.

More specifically, according to an embodiment of the invention, the protocol processing unit is provided with a management table comprising a plurality of table entries each indicating the correspondence of an identifier of a user terminal, from which a connection initiation request packet was transmitted, to status information indicating the type of a communication control packet in a reception waiting state. The protocol processing unit operates to add a new table entry into the management table when a new connection initiation request packet was received from one of user terminals, the new table entry including a user terminal identifier extracted from the header of the received packet and status information indicating that a response packet to the connection initiation request is in a reception waiting state; to judge when a response packet to the connection initiation request packet was received, whether the received packet should be forwarded to the user terminal or discarded based on the status information in a table entry that includes the user terminal identifier matched with a destination user terminal identifier specified in the header of the received packet; and to change the status information to a reception waiting state of another control packet determined depending on a communication control procedure when the received response packet is forwarded to the user terminal.

In another embodiment of the invention, the protocol processing unit operates to search the management table for a table entry when a response packet to the connection initiation request packet was received, the table entry to be searched including the user terminal identifier matched with a destination user terminal identifier specified in the header of the received packet; to add a new table entry into the management table when no table entry corresponding to the destination user terminal identifier was searched, the new table entry including the user terminal identifier extracted from the header of the received packet and status information indicating a reception waiting state of another control packet determined depending on a communication control procedure; and to judge when a table entry corresponding to the destination user terminal identifier was searched, whether the received packet should be forwarded to the user terminal or discarded based on the status information in the searched table entry.

According to an improved embodiment of the invention, the protocol processing unit is provided with a monitor target packet table for previously designating the type of communication control packets to be monitored, and the protocol processing unit performs forwarding control of a communication control packet received through one of the line interfaces based on the forwarding control information searched from the management table if the received packet is designated as one of communication control packets to be monitored in the monitor target packet table, and routes the received packet to one of the other line interfaces according to its header information if the received packet is not designated in the monitor target packet table.

In the packet forwarding apparatus of the invention, the protocol processing unit comprises, for example, a routing unit connected to the plurality of line interfaces and a control processor connected to the routing unit to control forwarding of communication control packets according to the management table. In this configuration, the routing unit forwards communication control packets received through the line interfaces to the control processor and routes communication control packets received from the control processor and user packets received through each of the line interfaces to any of the line interfaces in accordance with the header information of each packet. However, the routing unit may forward to the control processor only communication control packets, which are designated by the monitor target packet table and selected from communication control packets received through each of the line interfaces.

The packet forwarding apparatus of the invention can function, for example, as an L2SW, a PON system, a wireless access point, or a wireless bridge by applying, as the line interfaces, metal line interfaces, optical line interfaces, wireless line interfaces, or line interfaces with an Optical Line Terminal (OLT) function that is used in a office side apparatus of PON (Passive Optical Network) system.

The packet forwarding apparatus of the invention makes it possible, by providing with a function of selectively forwarding one of response packets received from a plurality of gateways to a connection requester user terminal, to connect an access network and an Internet transit network through a plurality of redundant gateways, without providing special communication control software implementation on the user terminal. Further, by providing the protocol processing unit with a function of distinguishing communication protocols, the packet forwarding apparatus of the invention allows diverse user terminals using different communication protocols, such as, for example, PPPoE terminals and EAPOL terminals (supplicants) in IEEE 802.1X, to coexist in a same layer-2 access network.

BRIEF DESCRIPTION OF THE DRAWINGS

These and other features, objects and advantages of the present invention will become more apparent from the following description when taken in conjunction with the accompanying drawings wherein:

FIG. 2 is a diagram to explain a GW selecting function of a GW selector;

FIGS. 3A to 3C show the formats of communication control frames being used in IEEE 802.1X;

FIG. 5 is a block diagram illustrating an embodiment of the GW selector;

FIGS. 6A to 6C illustrate changes of table entries for IEEE 802.1X in a connection management table provided in the GW selector;

FIG. 7 shows an example of a structure of a port management table provided in the GW selector;

FIGS. 17A to 17C illustrate changes of table entries for PPPoE in a connection management table provided in the GW selector.

DETAILED DESCRIPTION OF PREFERRED EMBODIMENTS

Preferred embodiments of a packet forwarding apparatus according to the present invention will be described hereinafter with reference to the drawings.

Figure 1:
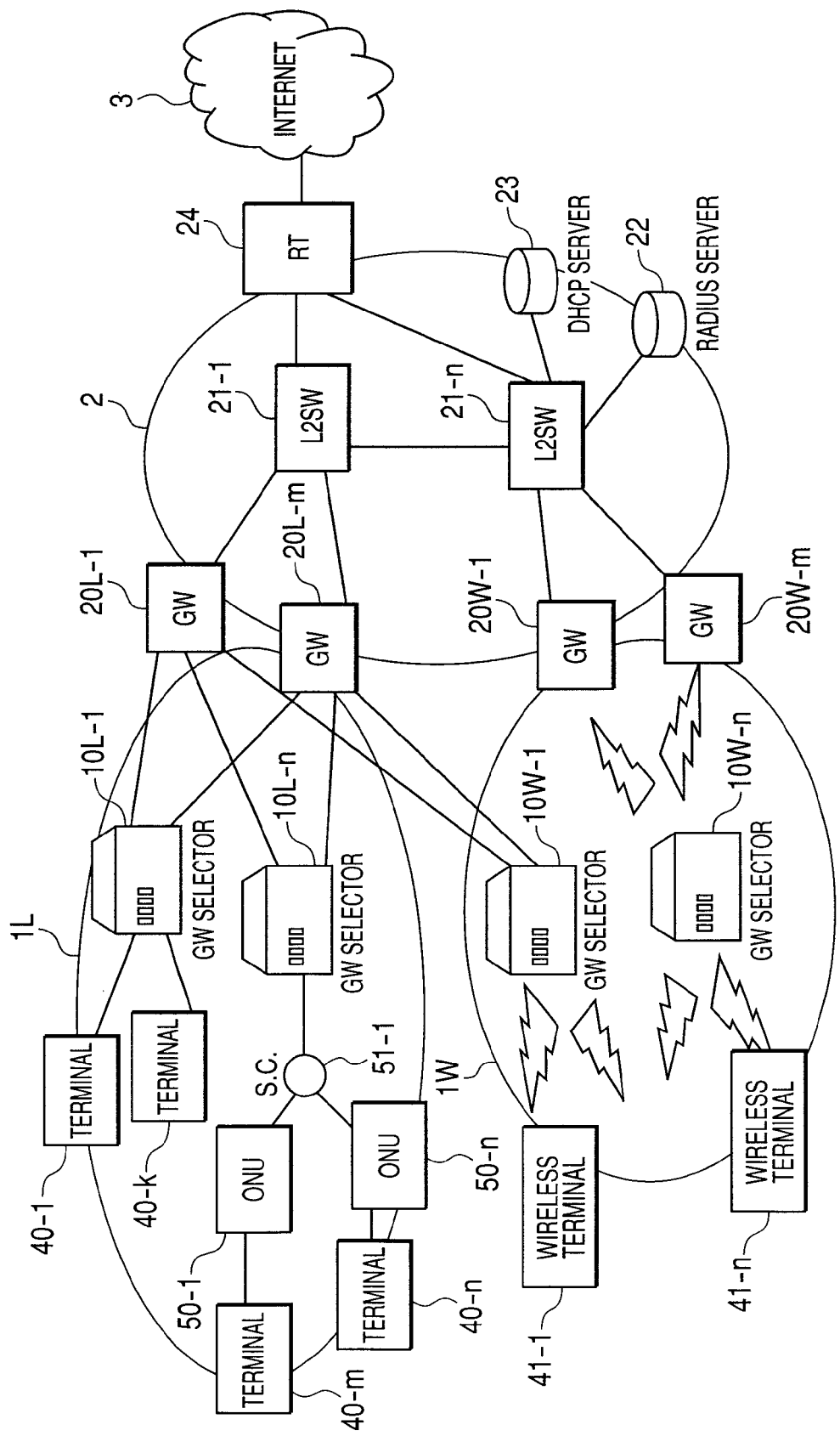
FIG. 1 shows an example of a communication network topology to which packet forwarding apparatuses (GW selectors) of the present invention are applied.

FIG. 1 shows a communication network topology to which packet forwarding apparatuses of the present invention are applied. The communication network system presented here includes a wired access network 1L, a wireless access network 1W, a transit network 2 belonging to a telecommunications carrier or ISP, and an Internet network 3.

The wired access network 1L and the wireless access network 1W are connected to the transit network 2 via gateways (GWs) 20L (20L-1, 20L-m) and 20W (20W-1, 20W-m). Each gateway has a function of terminating communication frames conforming to different protocols such as, for example, IEEE 802.1X and PPPoE.

The wired access network 1L includes a plurality of packet forwarding apparatuses 10L (10L-1, 10L-n) and a plurality of LAN terminals 40 (40-1 to 40-$n$) connected to one of packet forwarding apparatuses 10L. Each of the LAN terminals 40 has a session connection function conforming to IEEE 802.1X, PPPoE, or the like, Each of the packet forwarding apparatuses 10L is connected to a plurality of redundant GWs 20L (20L-1, 20L-m).

Each packet forwarding apparatus 10L according to the present invention has a GW selecting function of selectively connecting each wired LAN terminal 40 to one of the redundant GWs 20L, as will be described later, in addition to a normal L2SW function of forwarding received packets according to layer 2 header information. In the following description, noting at the GW selecting function especially, the packet forwarding apparatus 10L will be referred to as "GW selector".

In the wired access network 1L presented here, a GW selector 10L-1 communicates with a plurality of wired LAN terminals (40-1 to 40-$k$) via individual access lines. A GW selector 10L-n communicates with a plurality of wired LAN terminals (40-$m$ to 40-$n$) via a Passive Optical Network (PON). The PON comprises a plurality of subscriber connection apparatus ONUs (Optical Network Units) 50 (50-1 to 50-$n$), an office side apparatus OLT (Optical Line Terminal) incorporated in the GW selector 10L-n, and an optical fiber network with a structure in which one optical fiber connected to the OLT is branched into a plurality of branch optical fibers by a star coupler (S.C.) 51-1.

On the other hand, the wireless access network 1W comprises a plurality of wireless terminals 41 (41-1 to 41-$n$) each having a session connection function in accordance with IEEE 802.1X, PPPoE, or the like, and a plurality of packet forwarding apparatuses 10W (10W-1, 10W-n) for communicating with these wireless terminals 41. In the exemplified network presented here, a packet forwarding apparatus 10W-1 has a wireless-wired conversion function and is connected to a plurality of redundant GWs 20L (20L-1 to 20L-m). A packet forwarding apparatus 10W-n has a wireless hub function such as frequency conversion, frame conversion and others and is connected to a plurality of redundant GWs 20W (20W-1, 20W-m).

Each of packet forwarding apparatuses 10W (10W-1 to 10W-n) forming the wireless access network 1W also has a GW selecting function to selectively connect each wireless terminal 41 to one of the redundant GWs 20. Thus, in the following description, these packet forwarding apparatuses 10W as well will be referred to as "GW selectors".

The transit network 2 comprises a plurality of layer-2 switches (L2SWs) 21 (21-1 to 21-$n$), a user authentication server (RADIUS server) 22, a DHCP server 23 for allocating an IP address to each user terminal, and a router 24 for connecting the transit network to the Internet network 3. In the exemplified network presented here, an L2SW 21-1 is connected to the router 24 and a group of redundant GWs (20L-1 to 20L-m), and an L2SW 21-$n$ is connected to the router 24 and another group of redundant GWs (20W-1 to 20W-m). Although the RADIUS server 22 and the DHCP server 23 are connected to the L2SW 21-$n$ here, at least one of them may be connected to the L2SW 21-1.

FIG. 2 is a diagram to explain the GW selecting function provided in the GW selector 10L-1 of the present invention. Other GW selectors 10L-n, 10W1 to 10W-n also have the same GW selecting function as the GW selector 10L-1. An operation will be described blow in the case where the GW selector 10L-1 receives a session connection request from the wireless LAN terminal 40-1 which executes a session connection procedure according to IEEE 802.1X and a session connection request from a wired LAN terminal 40-m which executes a session connection procedure according to PPPoE.

Upon receiving an IEEE 802.1X connection request to connect to the transit network 2 from the wired LAN terminal 40-1, the GW selector 10L-1 supervises a connection control procedure, regarding the wired LAN terminal 40-1 as a supplicant and the GWs (20L-1, 20L-m in FIG. 1) connected to the GW selector 10L-1 as authenticators 20LX-1, 20LX-2. When responses to the connection request were received from these GWs (authenticators), the GW selector 10L-1 selects one of the GWs, for example, the GW 20L-1 as an active authenticator 20LX-1, and continues a subsequent communication control procedure for connecting the supplicant 40-1 to the transit network. In this case, packet transfer between the supplicant 40-1 and the other GW 20L-2 (20LX-2) is not carried out.

Similarly, when a PPPoE connection request was received from the wired LAN terminal 40-m, the GW selector 10L-1 supervises a connection control procedure, regarding the wired LAN terminal 40-m as a PPPoE terminal and the GWs (20L-1, 20L-m in FIG. 1) connected to the GW selector 10L-1 as BASs 20LP-1, 20LP-2. Upon receiving responses to the above connection request from these GWs (BASs), the GW selector 10L-1 selects one of the GWs, for example, a GW 20L-1 as an active BAS 20LP-1, and continues a subsequent communication control procedure. In this case, no packet transfer takes place between the PPPoE terminal 40-m and the other GW 20L-2m (20LX-2).

FIGS. 3A to 3C show the formats of communication control frames being used in IEEE 802.1X.

FIG. 3A shows the format of a connection initiation packet, EAPOL-Start, which is transmitted from a wired LAN terminal 40. FIG. 3B shows the format of an ID request packet, EAP-Request/ID Request, which is transmitted from a GW 20 to the wired LAN terminal 40. FIG. 3C shows the format of a disconnection notification packet, EAPOL-Logoff, which is transmitted from the wired LAN terminal 40 to the GW 20.

These communication control frames are provided with an Ethernet header 900 and an EAP header 910. The Ethernet header 900 includes a destination MAC address (MAC-DA) 901, a source MAC address (MAC-SA) 902, and protocol type 903. The EAP header 910 includes EAP type 911 and EAP code 912.

As shown in FIG. 3A, EAPOL-Start includes a multicast MAC address "01-80-C2-00-00-03" being exclusively used for EAP in the MAC-DA 901 field. If the source wired LAN terminal has known the MAC address of the GW (active authenticator) 20, the MAC address of the GW 20 is set in the MAC-DA 901 field. In the MAC-SA 902 field of EAPOL-Start, the MAC address of the wired LAN terminal 40 is set. In the protocol type 903 field, a particular value representing EAP such as, for example, "0x888E" or "0X88C7" is set. In the EAP type 911 field, a code denoting this EAP frame includes "EAPOL Start" is set.

As shown in FIG. 3B, EAP-Request/ID Request, includes the MAC address of the wired LAN terminal 40 (the source of EAPOL-Start) in the MAC-DA 901 field and the MAC address of the GW 20 that is the source of the EAP-Request/ID Request packet in the MAC-SA 902 field. In the protocol type 903 field, a particular value representing EAP such as "0x888E" or "0X88C7" is set. The EAP header 910 of EAP-Request/ID Request includes "EAPOL Packet" in the EAP type 911 field and a code denoting this EAP frame is "Request" in the EAP code 912 field.

As shown in FIG. 3C, EAPOL-Logoff includes the MAC address of the GW 20 in the MAC-DA 901 field and the MAC address of the wired LAN terminal 40 in the MAC-SA 902 field. In the protocol type 903 field, a particular value representing EAP such as "0x888E" or "0X88C7" is set. In the EAP type 911 field, a code denoting this EAP frame includes "EAPOL Logoff" is set.

FIGS. 4A to 4D show the formats of communication control frames being used in PPPoE.

Figure 4A:
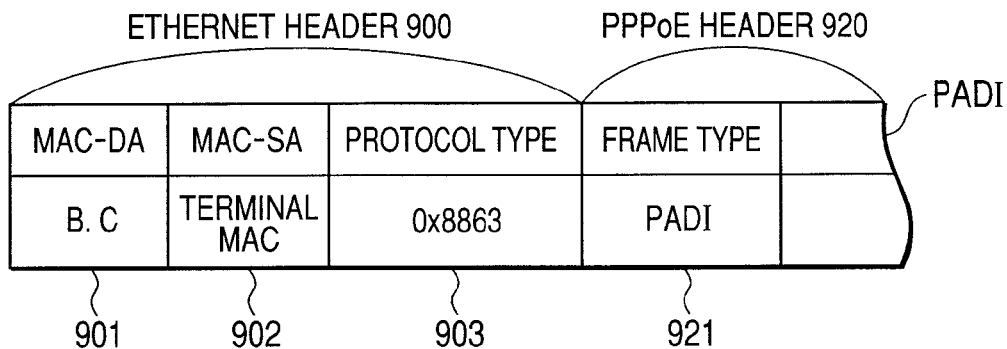
FIGS. 4A to 4D show the formats of communication control frames being used in PPPoE.
Figure 4B:
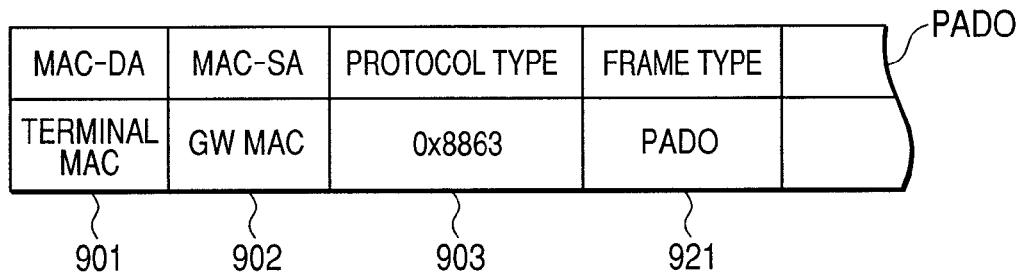
Figure 4C:
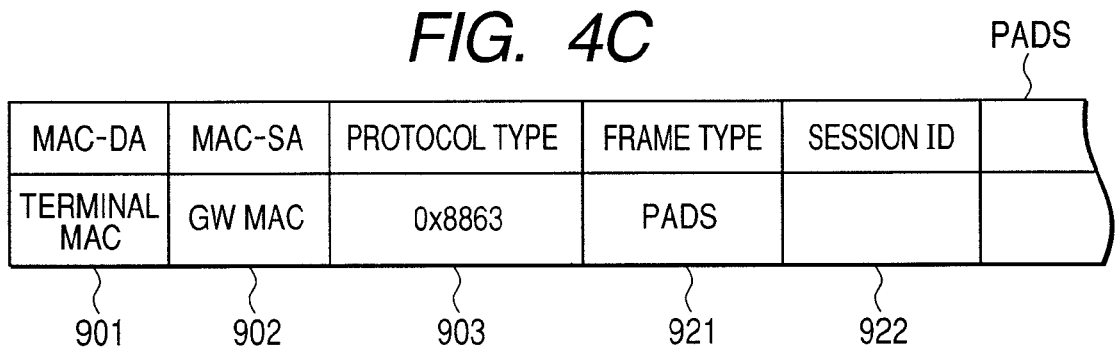
Figure 4D:
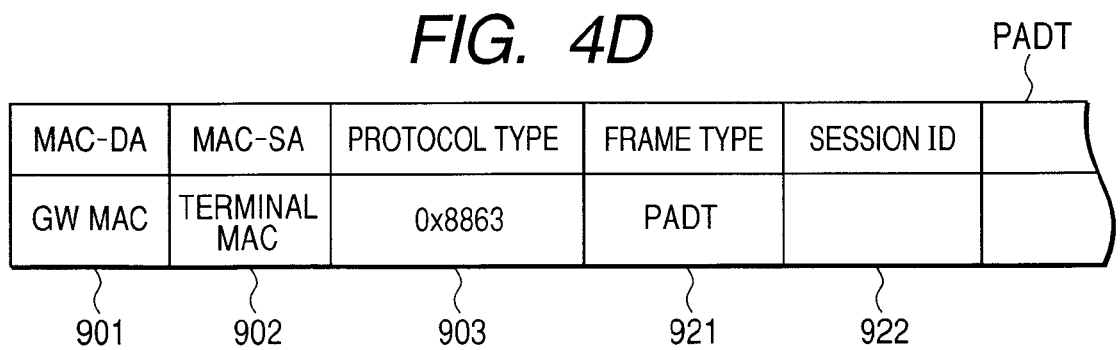

FIG. 4A shows the format of a connection initiation packet, PADI (PPPoE Active Discovery Initiation), which is transmitted from a wired LAN terminal 40 to a GW 20. FIG. 4B shows the format of a connection initiation response packet, PADO (PPPoE Active Discovery Offer), which is transmitted form the GW 20 to the wired LAN terminal 40. FIG. 4C shows the format of a session ID notification packet, PADS (PPPoE Active Discovery Session-Confirmation), which is transmitted from the GW 20 to the wired LAN terminal 40. FIG. 4D shows the format of a disconnection notification packet, PADT (PPPoE Active Discovery Terminate), which is issued by the wired LAN terminal 40 or the GW 20. These communication control frames are provided with an Ethernet header 900 and a PPPoE header 920.

As shown in FIG. 4A, PADI includes a broadcast MAC address (B. C) in a MAC-DA 901 field and the MAC address of the wired LAN terminal 40 in a MAC-SA 902 field. In a protocol type 903 field, a particular value representing PPPoE such as "0x8863" is set. In a frame type 921 field of the PPPoE header, a code denoting this PPPoE frame includes "PADI" is set.

As shown in FIG. 4B, PADO includes the MAC address of the wired LAN terminal 40 in the MAC-DA 901 field and the MAC address of the GW 20 in the MAC-SA 902 field. In the protocol type 903 field, a particular value representing PPPoE such as "0x8863" is set. In the frame type 921 field of the PPPoE header, a code denoting this PPPoE frame includes "PADO" is set.

As shown in FIG. 4C, PADS includes the MAC address of the wired LAN terminal 40 in the MAC-DA 901 field and the MAC address of the GW 20 in the MAC-SA 902 field. In the protocol type 903 field, a particular value representing PPPoE such as "0x8863" is set. In the frame type 921 field of the PPPoE header, a code denoting this PPPoE frame includes "PADS" is set. In a session ID 922 field, the value of a session ID assigned to the wired LAN terminal 40 from the GW 20 is set.

As shown in FIG. 4D, PADT includes, if it is transmitted from the wired LAN terminal 40 to the GW 20, the MAC address of the GW 20 in the MAC-DA 901 field and the MAC address of the wired LAN terminal 40 in the MAC-SA 902 field. In the protocol type 903 field, a particular value representing PPPoE such as "0x8863" is set. If PADT is transmitted from the GW 20 to the wired LAN terminal 40, the addresses in the MAC-DA 901 and MAC-SA 902 fields are reversed. In the frame type 921 field of the PPPoE header, a code denoting this PPPoE frame includes "PADT" is set. In the session ID 922 field, the ID of the session to be disconnected is set.

FIG. 5 shows an embodiment of the packet forwarding apparatus (GW selector) 10 according to the present invention.

The GW selector 10 comprises a plurality of line interfaces 11 (11-1 to 11-n) to which individual port numbers (Port-1 to Port-n) are assigned respectively, a routing unit 12 connected to the line interfaces, a transmitting buffer 13T and a receiving buffer 13R for buffering communication control packets, a control processor 14, and a memory 15.

The routing unit 12 and the control processor 14 constitute a protocol processing unit for controlling packet forwarding among the line interfaces 11. In the memory 15, a communication control routine 16 to be executed by the processor, a monitor target packet table 17, a connection management table 18, and a port management table 19 are stored.

The communication control routine 16 includes receive processing routines for various types of control packets, which will be described later with reference to FIGS. 9 to 11 and FIGS. 13 to 16, and a timer monitoring routine. The monitor target packet table 17 specifies the types of communication control packets to be processed by the control processor 14. Operation mode of the control processor 14 can be changed by rewriting the contents of the monitor target packet table 17 from a control terminal 50 in accordance with input operations by an operator. The connection management table 18 and the port management table 19 will be described in detail later with reference to FIGS. 6 and 7.

If the GW selector 10 is a GW selector 10L-1 in a wired access network 1L shown in FIG. 1, each of the line interfaces 11-1 to 11-n has a function of terminating frames conforming to a communication protocol applied to each connection line, such as Ethernet, ATM, and POS (PPP over SONET). If the GW selector 10 is a GW selector 10L-n connected to a PON, each of the line interfaces 11-1 to 11-n is configured to have an OLT function that terminates PON frames such as, for example, GE-PON, G-PON, and WDM-PON.

If the GW selector 10 is a GW selector 10W-1 in a wireless access network 1W shown in FIG. 1, each of the line interfaces for wireless terminals 41 has a wireless interface function conforming to a communication protocol applied to a wireless link, such as, for example, IEEE 802.11a, IEEE 802.11b, IEEE 802.11g, IEEE 802.16a, and PHS. Each of the line interfaces for the GWs 20 has an interface function conforming to a communication protocol applied to a wired LAN section, such as Ethernet, ATM, POS (PPP over SONET), GE-PON, G-PON, and WDM-PON.

If the GW selector 10 is a GW selector 10W-n shown in FIG. 1, each of the line interfaces has a wireless interface function conforming to a communication protocol applied to a wireless link, as is the case of the line interface for the wireless terminal 41 in the GW selector 10W-1.

FIGS. 6A to 6C illustrate a structure of the connection management table 18 and changes in the contents of the table.

The connection management table 18 comprises a plurality of table entries, each having a port number 181 of a line interface connected to a terminal. Hereinafter, the port number is referred to as a terminal port number. Each table entry indicates the correspondence of the terminal port number 181 to a terminal MAC address 182, a port number 183 of a line interface connected to a GW (hereinafter referred to as a GW port number), a GW MAC address 184, a status 185, and a timer value 186. The status 185 indicates the current status in a communication control procedure being executed in a session with a user terminal having the terminal MAC address 182 or the type of a communication control packet that the GW selector is waiting to receive.

FIG. 7 shows an example of the structure of the port management table 19.

The port management table 19 includes a plurality of table entries corresponding to the port numbers 191 of the line interfaces 11-1 to 11-n. Each table entry indicates a GW connection flag 192 for indicating whether a line interface having the port number 191 is connected to a line for one of the GWs and a source MAC address 193 for indicating the source of each packet received through the line interface.

The port management table 19 shown here represents the connective relation among the GW selector 10L-1, the terminals 40-1 to 40-m, and the GWs 20LX-1 to 20LP-2 in the network topology schematically shown in FIG. 2, as appreciated from the values of the port number 191 and the values in the MAC address 193 column. In practical application, the GW connected to the GW selector 10L-1 may have both functions of authenticator and BAS or may only have either of these functions. In the latter case, the GW operating as an authenticator (or BAS) makes no response to a connection initiation packet of PPPoE (or EAPOL).

Upon receiving a packet through one of the line interfaces 11-1 to 11-n, the routing unit 12 registers the relation of the port number of the port having received the packet and the source MAC address (MAC-SA 902) of the received packet into the port management table 191. The routing unit 12 judges whether the received packet is a communication control packet of IEEE 802.1X, PPPoE, or the like, illustrated in FIGS. 3 and 4, from the header information of the received packet. If the received packet is a communication control packet, the routing unit 12 forwards the received packet and the port number to the control processor 14 via the receiving buffer 13R.

The control processor 14 reads out the communication control packet and the port number from the receiving buffer 13R and performs GW selection and communication control as will be described later. The communication control packet to be forwarded to an external line is output from the control processor 14 to the transmitting buffer 13T.

The routing unit 12 performs routing of received packets, including user packets received through the line interfaces 11-1 to 11-n and communication control packets received from the control processor 14 via the transmitting buffer 13T, according to the port management table 19. Specifically, the routing unit 12 searches the port management table 19 for a table entry including a MAC address 193 matched with the destination MAC address (MAC-DA 901) of the received packet and forwards the received packet to a particular line interface denoted by the port number 191 in the searched table entry.

If there is no table entry corresponding to the destination MAC address in the port management table 19, or if the destination address of the received packet is a broadcast address or a multicast address, the routing unit 12 forwards the received packet to all ports (line interfaces) other than the port having received the packet. However, if the communication control packet read out from the transmitting buffer 13T is a connection initiation request packet (EAPOL-Start packet or PADI packet), the routing unit 12 broadcasts the packet to ports for which the GW connection flag 192 is set into a "1" state in the port management table 19.

The types of communication control packets to be monitored by the control processor 14 are specified in the monitor target packet table 17. The control processor 14 judges whether the communication control packet read out from the receiving buffer 13R is one of monitor target packets. Communication control packet other than monitor target packets is immediately output to the transmitting buffer 13T. Upon receiving a communication control packet to be monitored, the control processor 14 updates the connection management table 18 in accordance with the communication control routine 16 and outputs the communication control packet to the transmitting buffer 13T. As will be described later, the control processor 14 selects one of response packets returned from the GWs in response to the connection initiation request, forwards the selected response packet to the user terminal and discards the remaining response packets.

The packet forwarding apparatus (GW selector) 10 of the present invention can perform above GW selection in several ways. For example, (1) the GW selector selects, from among a plurality of response packets (EAP-Request/ID Request or PADO) received from a plurality of GWs in response to the same connection initiation request (EAPOL-Start or PADI), a response packet having been received first as an active one and discards the other response packets having been received subsequently; (2) the GW selector selects, from among a plurality of response packets having been received within a predetermined period of time, a response packet transmitted from a GW that is different from a previously selected GW as an active one and discards the other response packets; and (3) the GW selector previously gives a priority level to each of GWs forming a redundant GW group and selects a response packet transmitted from a GW having the highest priority level from among a plurality of response packets having been received within a predetermined period of time. The priority level to be given to each GW may be changed periodically. In this case, for example, a random priority level generated by a random number generator may be assigned to each of the GWs forming the redundant group.

Next, IEEE 802.1X connection control by the GW selector 10 of the present invention will be described with reference to FIGS. 6 to 11. Here, the connection control will be described in a case where the GW selector 10L-1 shown in FIG. 2 adopts a GW selection method in which the first received response packet is selected as an active one from among response packets (EAP-Request/ID Request) received from the GWs 20L-1, 20L-2 (authenticators 20LX-1, 2LX-2).

Figure 8:
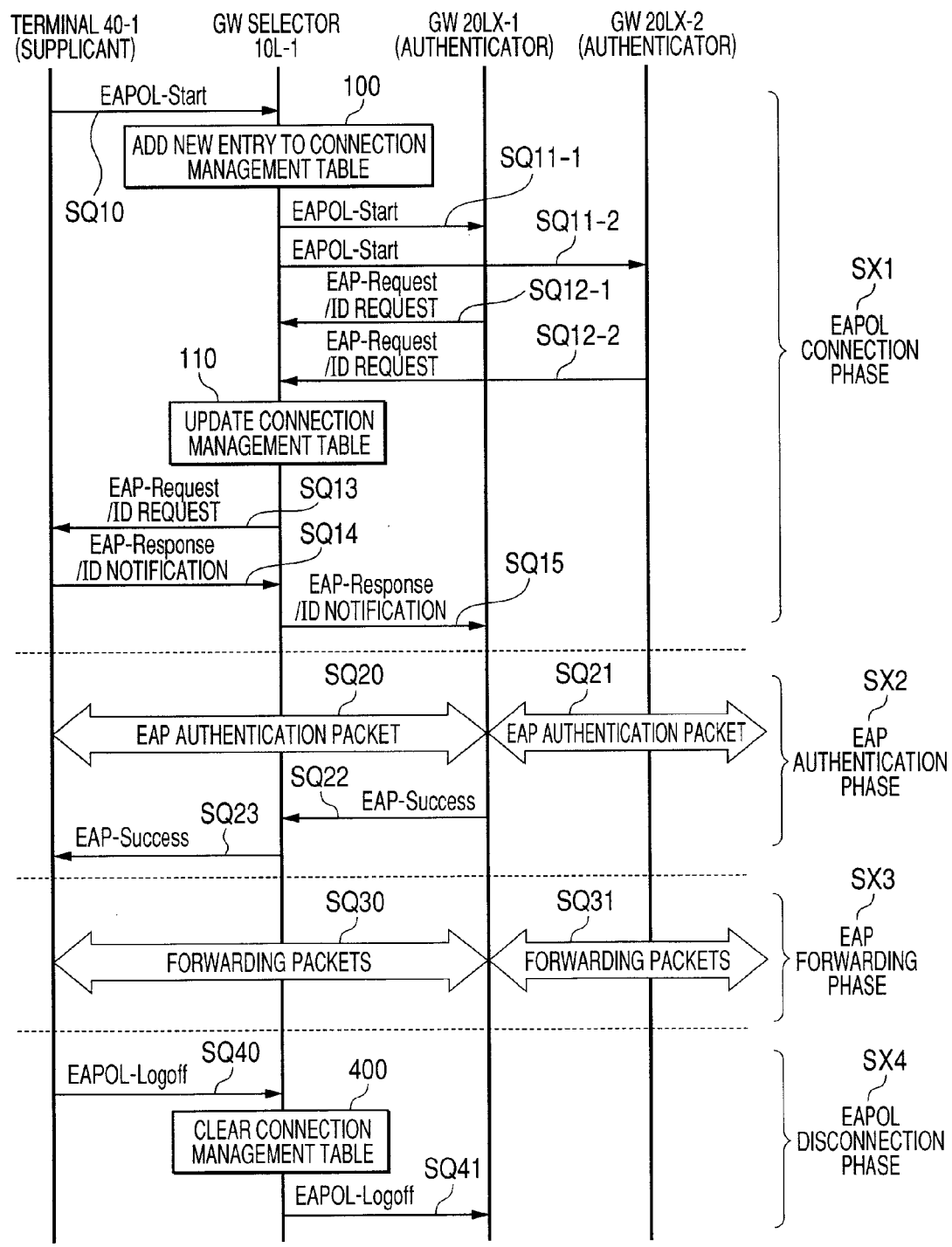
FIG. 8 is a sequence diagram illustrating IEEE 802.1X connection control by the GW selector of the present invention.

As indicated in a communication sequence of FIG. 8, when the terminal (supplicant) 40-1 transmits an EAPOL-Start packet (SQ10), an EAPOL connection phase SX1 starts. The EAPOL-Start packet includes a multicast address "01-80-C2-00-00-03" as its destination MAC address (MAC-DA). When the GW selector 10L-1 receives the EAPOL-Start, the control processor 14 executes an EAPOL-Start receive processing routine 100 illustrated in FIG. 9. The EAPOL-Start receive processing routine 100 constitutes a part of the communication control routine 16 together with an EAP-Request/ID Request receive processing routine 110 and an EAPOL-Logoff packet receive processing routing 400, which will be described later.

In the EAPOL-Start receive processing routine 100, the control processor 14 first determines whether EAPOL-Start packet is specified as a monitor target packet (101). Packet types to be monitored as target packet are specified in the monitor target packet table 17. If EAPOL-Start is not specified as a monitor target, the control processor 14 forwards the EAPOL-Start packet to the routing unit 12 via the transmitting buffer 13T (108) and exits this routine.

In the present embodiment, it is assumed that EAPOL-Start is specified as a monitor target. In this case, the control processor 14 searches the connection management table 18 for a table entry including a terminal MAC 182 matched with a value "00-00-00-00-00-01" of the source MAC address (MAC-SA 902) of the received packet (102). Usually, when the EAPOL-Start packet is received, there is no table entry corresponding to the MAC-SA 902 of the received packet in the connection management table 18.

As a result of the table search (103), if a table entry looked for is not found, the control processor 14 registers, as shown in FIG. 6A, a new table entry including a port number "1", which was notified from the routing unit 12, as the terminal port 181, and the MAC-SA value "00-00-00-00-00-01" as the terminal MAC 182 into the connection management table 18 (105), sets the status 185 of this table entry to EAP-Request/ID Request waiting state (106), initializes the timer value 186 (107), and forwards the EAPOL-Start packet to the routing unit 12 (108).

If a table entry matched with the MAC-SA of the received packet is found as a result of the table search (103), the control processor 14 regards the EAPOL-Start packet as a packet retransmitted from the same terminal. In this case, the control processor 14 executes steps 105 to 108 after deleting the searched table entry from the connection management table 18 (104).

Upon receiving the EAPOL-Start packet from the control processor 14 via the transmitting buffer 13T, the routing unit 12 refers to the port management table 19 and broadcasts the received packet to a plurality of line interfaces, according to the port numbers 191 designated by the table entries in which the GW connection flag 192 is "1" (SQ11-1, SQ11-2 in FIG. 8).

The authenticators 20LX-1 and 20LX-2 return EAP-Request/ID Request packets, respectively, in response to the EAPOL-Start packet (SQ12-1, SQ12-2). The routing unit 12 of the GW selector 10L-1 outputs the EAP-Request/ID Request packet received from the authenticator 20LX-1 together with a port number "4" of the line interface having received this packet to the receiving buffer 13R. Another EAP-Request/ID Request packet received from the authenticator 20LX-2 is also output to the receiving buffer 13R, together with a port number "n" of the line interface having received this packet.

Figure 10:
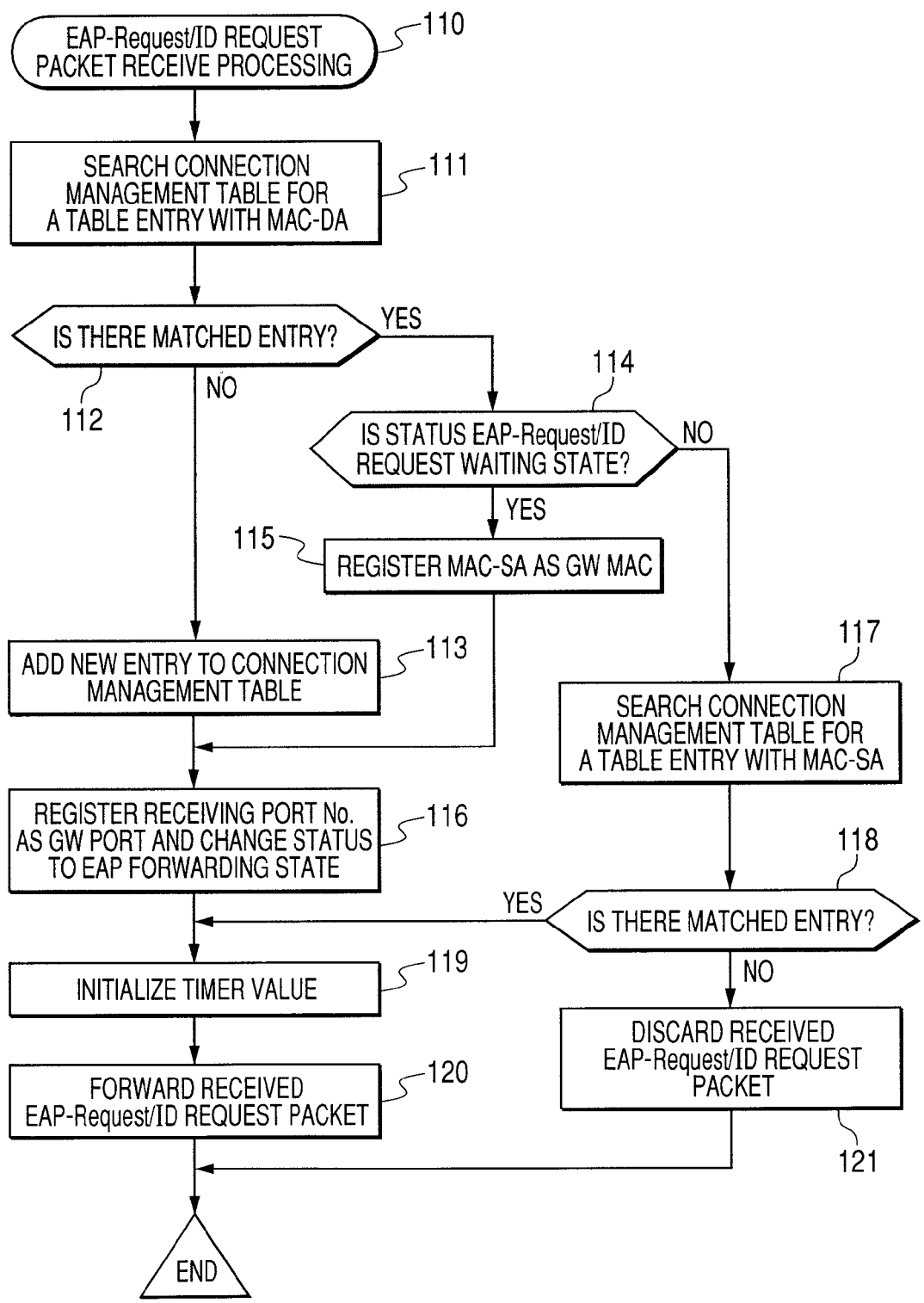
FIG. 10 is a flowchart of an EAP-Request/ID Request packet receive processing routine 110 to be executed by the GW selector.

Upon receiving the EAP-Request/ID Request from the authenticator 20LX-1, the control processor 14 executes the EAP-Request/ID Request receive processing routine 110 illustrated in FIG. 10. First, the control processor 14 searches the connection management table 18 for a table entry including a terminal MAC 182 matched with a value "00-00-00-00-00-01" of the destination MAC address (MAC-DA 901) of the received packet (111). If a table entry matched with the destination MAC address is found as a result of the table search (112), the control processor 14 judges whether the status 185 in the searched table entry is EAP-Request/ID Request waiting state (114).

Because the status 185 is EAP-Request/ID Request waiting state at this time, the control processor 14 registers, as shown in FIG. 6B, an address value "00-00-00-11-11-01" specified by the source MAC address (MAC-SA 902) of the received packet into the GW MAC 184 field of the table entry (115), the port number "4" into the GW port 183 field of the table entry, and changes the status 185 to EAP forwarding state (116). After that, the control processor 14 initializes the timer value 186 in the table entry (119), forwards the received packet (EAP-Request/ID Request) to the routing unit 12 via the output buffer 13T (120), and exits this routine. As the timer value 186, a large initial value is set so that time over occurs after all response packets (EAP-Request/ID Request) transmitted in response to the EAPOL-Start packet have arrived at the control processor 14.

Upon receiving the EAP-Request/ID Request packet from the control processor 14, the routing unit 12 refers to the port management table 19. Because the port number corresponding to the destination MAC address ("00-00-00-00-00-01") is "1" in the port management table 19, the EAP-Request/ID Request is transmitted to the user terminal 40-1 through the line interface having the port number "1" (SQ13).

Figure 9:
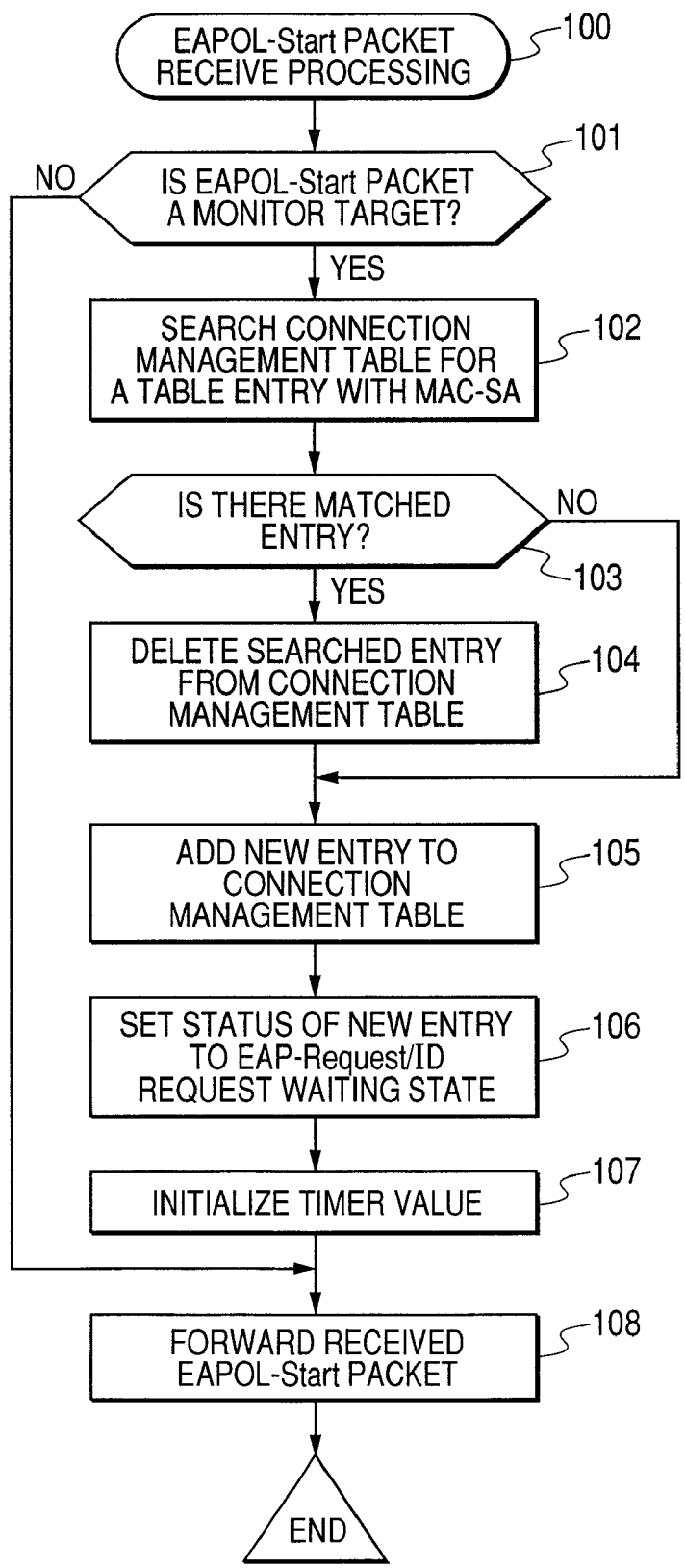
FIG. 9 is a flowchart of an EAPOL-Start packet receive processing routine 100 to be executed by the GW selector.

If EAPOL-Start is not specified as a monitor target packet, registering a table entry having the terminal MAC address "00-00-00-00-00-01" into the connection management table 18 is not performed in the EAPOL-Start packet receive processing 100 described by referring to FIG. 9. Thus, as the result of searching the connection management table (112) performed when the EAP-Request/ID Request was received, it is found that no table entry matched with the destination MAC address exists.

In this case, the control processor 14 creates a new table entry including a value "00-00-00-00-00-01" of the destination MAC address (MAC-DA 901) and a value "00-00-00-11-11-01" of the source MAC address (MAC-SA 902) of the received packet as the terminal MAC 182 and the GW MAC 184, respectively. In the terminal port 181 field of the table entry, the port number "1" corresponding to the destination MAC address "00-00-00-00-00-01", retrieved from the port management table 19 is set. However, if the destination MAC address "00-00-00-00-00-01" is not registered in the port management table 19, setting of the value of terminal port 181 may be omitted. After registering the table entry into the connection management table 18 (113), the control processor 14 executes step 116 and subsequent steps.

If the status 185 is not EAP-Request/ID Request waiting state at the judging step 114, the control processor 14 searches the connection management table 18 for a table entry including GW MAC 184 matched with the source MAC address (MAC-SA 902) of the received packet (117). As a result of the search (118), if a table entry corresponding to the source MAC address is found, the control processor 14 regards the received EAP-Request/ID Request as the one that was retransmitted as a retry packet from the same authenticator. Then, the control processor 14 initializes the timer value 186 in the searched table entry (119), transfers the EAP-Request/ID Request to the routing unit 12 (120) and exits this routine. If there is no table entry matched with the source MAC address in the connection management table 18, the control processor 14 discards the received packet (121) and exits this routine.

Upon receiving an EAP-Request/ID Request from the authenticator 20LX-2, the control processor 14 also executes the above EAP-Request/ID Request receive processing routine 110 and searches the connection management table 18 for a table entry including the terminal MAC 182 matched with the value "00-00-00-00-00-01" of the destination MAC address (MAC-DA 901) of the received packet (111).

If a table entry including the address value "00-00-00-00-00-01" as the terminal MAC 182 has been searched out, the control processor 14 judges the status 185 of the table entry (114). In this example, the status 185 of the table entry has already been changed to EAP forwarding state. In this case, the control processor 14 searches the connection management table 18 for a table entry including the GW MAC 184 matched with the value "00-00-00-11-11-02" of the source MAC address (MAC-SA 902) of the received packet (117). As result of the table search (118), it is found that the connection management table 18 has no table entry that includes the address value "00-00-00-11-11-02" as the GW MAC 184. Therefore, the control processor 14 discards the received packet (121), regarding the EAP-Request/ID Request received this time as the one that was transmitted from another one of redundant authenticators, and exits this routine.

In this way, even when a plurality of redundant GWs (authenticators 20LX-1, 20LX-2) return response packets in response to the same connection initiation request broadcasted by a terminal 40-1, by operating the GW selector 10L-1 so as to select one response packet replied from a particular authenticator (20LX-1 in this example) and to discard the other response packets from deselected GWs (authenticator 20LX-2 in this example), it is able to carry out the subsequent communication control procedure between the terminal (supplicant) 40-1 and the particular authenticator (20LX-1).

Upon receiving the EAP-Request/ID Request, the terminal (supplicant) 40-1 transmits an EAP-Response/ID notification packet to the authenticator 20LX-1 which is the source of the received packet (SQ14). Upon receiving the EAP-Response/ID notification packet, the control processor 14 of the GW selector 10L-1 immediately transfers the received packet to the routing unit 12, because the EAP-Response/ID notification packet received from the routing unit 12 is not a communication control packet specified as a monitor target packet beforehand, like EAPOL-Start and EAP-Request/ID Request. Upon receiving the EAP-Response/ID notification packet from the control processor 14, the routing unit 12 specifies, according to the port management table 19, a port number "4" corresponding to the destination MAC address "00-00-00-11-11-01" of the received packet, and forwards the received packet to the authenticator 20LX-1 through the line interface having the port number "4" (SQ15).

When the GW selector receives a communication control packet through a line interface, the routing unit 12 may refer to the monitor target packet table 17, so that the routing unit 12 can immediately route the communication control packet in accordance with the port management table 19 without forwarding it to the control processor 14, if the packet is not a monitor target, like the EAP-Response/ID notification.

The GW selector 10L-1 also forwards an EAP authentication packet (SQ20) and an EAP-Success packet (SQ22, SQ23), which are communicated between the terminal (supplicant) 40-1 and the GW (authenticator) 20LX-1 in an EAP authentication phase SX2 following the EAPOL connection phase SX1, in the same manner as for the above EAP-Response/ID notification. In the EAP authentication phase SX2, the authenticator 20LX-1 exchanges EAP authentication packets with the RADIUS server 22 (SQ21) and generates a response packet (e.g., EAP-Success packet) depending on the result of the authentication (SQ22).

In an EAP forwarding phase SX3 following the EAP authentication phase SX2, the GW selector 10L-1 also forwards packets (SQ30) communicated between the terminal (supplicant) 40-1 and the authenticator 20LX-1, in the same manner as for the above EAP-Response/ID notification. The authenticator 20LX-1 forwards a packet (user packet) received from the terminal (supplicant) 40-1 via the GW selector 10L-1 to the router 24 and forwards a packet (user packet) received from the router 24 to the terminal (supplicant) 40-1 via the GW selector 10L-1 (SQ31).

When the terminal user disconnects the access to the Internet, a disconnection request packet (EAPOL-logoff) is transmitted from the supplicant 40-1 (SQ40) and communication phase transits from the EAP forwarding phase SX3 to an EAPOL disconnection phase SX4. Upon receiving the EAPOL-logoff packet, the routing unit 12 of the GW selector 10L-1 outputs the packet to the receiving buffer 13R together with the port number "1" indicating the line interface having received the packet.

Figure 11:
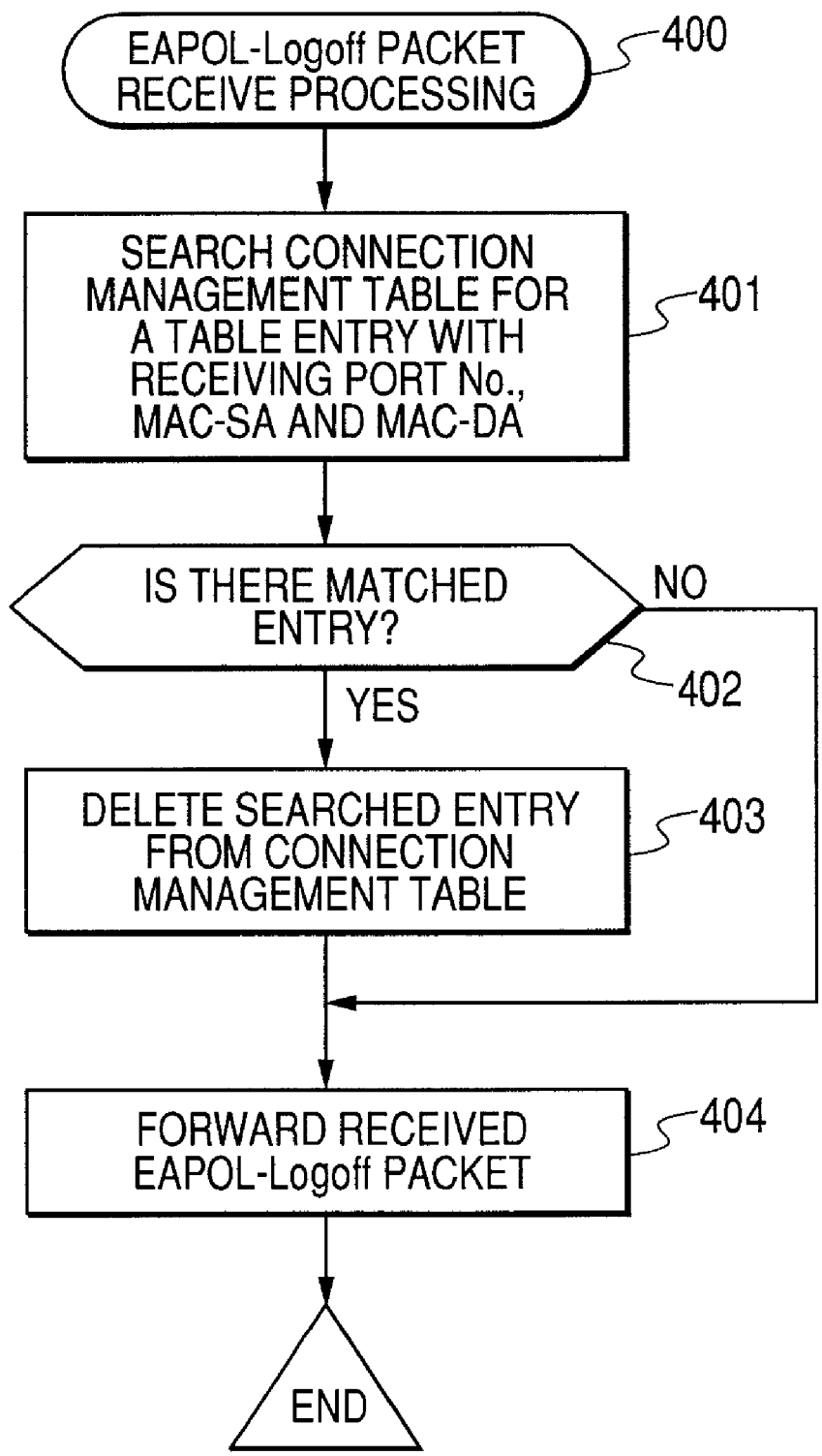
FIG. 11 is a flowchart of an EAPOL-logoff packet receive processing routine 400 to be executed by the GW selector.

When the EAPOL-logoff is read out from the receiving buffer 13R, the control processor 14 executes an EAPOL-logoff packet receive processing routine 400 illustrated in FIG. 11. In the EAPOL-logoff packet receive processing routine 400, the control processor 14 searches the connection management table 18, using a search key comprising the port number "1" notified from the routing unit 12 and the source MAC address "00-00-00-00-00-01" (MAC-SA 902) and the destination MAC address "00-00-00-11-11-01" (MAC-DA 901) of the received packet, for a table entry including the terminal port 181, terminal MAC 182, and GW MAC 184 matched with the search key (401). In this table search, however, the port number may be excluded from the search key.

As a result of the table search (402), if a table entry corresponding to the search key is found, the control processor 14 deletes the table entry from the connection management table 18 (403) as shown in FIG. 6C, forwards the EAPOL-logoff packet to the routing unit 12 (404), and exits this routine. If no table entry corresponding to the search key was searched, the control processor 14 forwards the EAPOL-logoff packet to the routing unit 12 (404) without updating the connection management table 18 and exits this routine.

The table entry in the connection management table 18 may also be deleted, in addition to the above EAPOL-logoff packet receive processing routine 400, in accordance with a timer monitoring routine (omitted from FIG. 5) to be activated at predetermined intervals. The timer monitoring routine decreases the timer value 186 indicated in each of table entries of the connection management table 18 at a predetermined rate and automatically deletes a table entry in which the timer value has become zero from the connection management table 18.

As can be appreciated from the above description, according to the present embodiment, even when a plurality of GWs (authenticators) reply to a connection initiation request broadcasted from a terminal (supplicant) 40, the supplicant 40 can carry out the subsequent communication control procedure with a particular authenticator selected by the packet forwarding apparatus (GW selector) 10L. Accordingly, the present invention can realize redundant configuration of authenticators, independently of control software implementation on the supplicant 40.

Next, PPPoE connection control by the GW selector of the present invention will be described with reference to FIGS. 12 to 17. Here, the connection control will be described in a case where the GW selector 10L-1 shown in FIG. 2 adopts a GW selection method in which the first received response packet is selected as an active one from among response packets (PADO) received from the GWs 20L-1, 20L-2 (BASs 20LP-1, 2LP-2).

Figure 12:
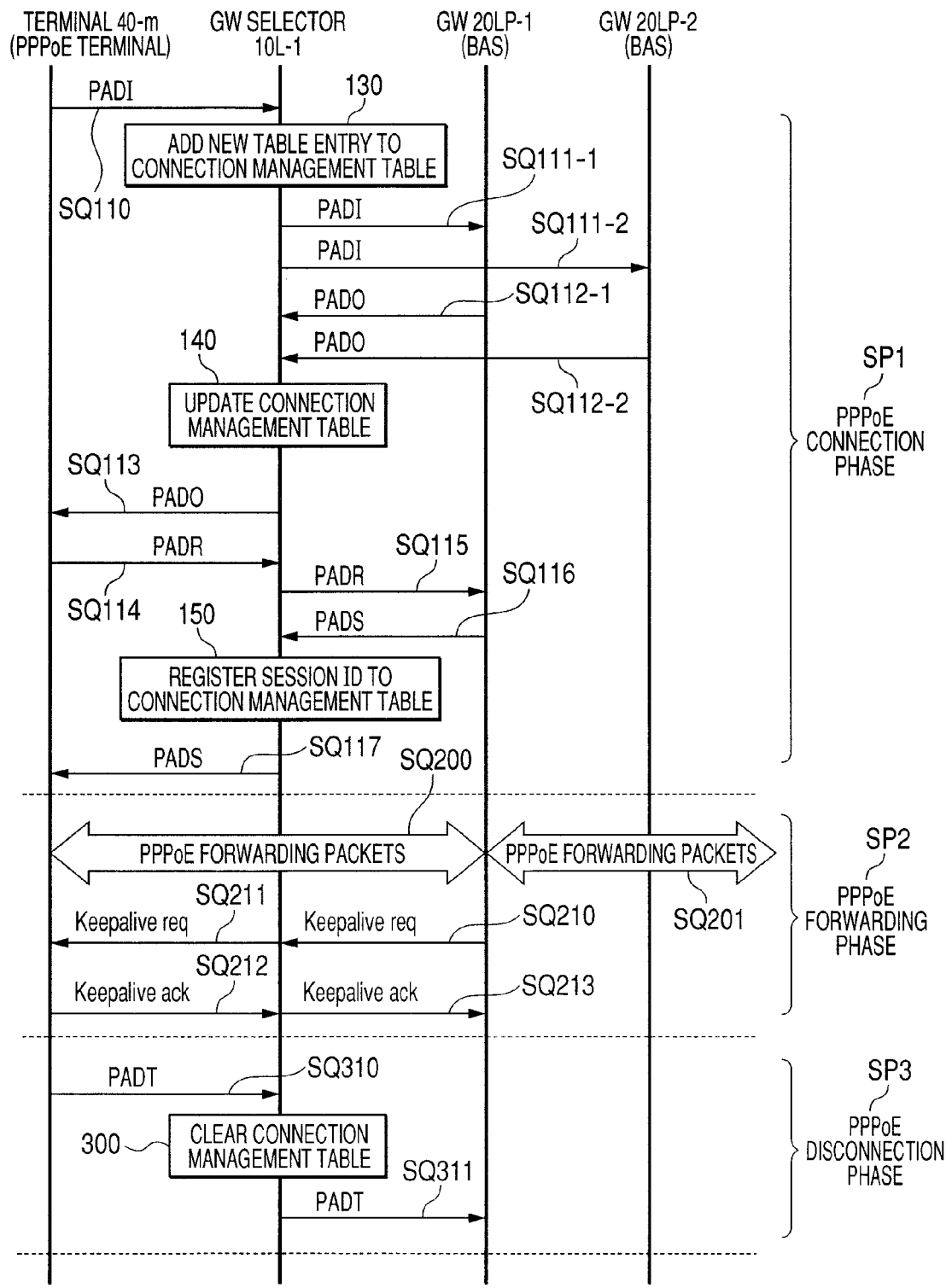
FIG. 12 is a sequence diagram illustrating PPPoE connection control by the GW selector of the present invention.

As illustrated in FIG. 12, when a terminal (PPPoE terminal) 40-*m* broadcasts a PADI packet (SQ110), a PPPoE connection phase SP1 starts. Upon receiving the PADI packet, the routing unit 12 of the GW selector 10L-1 outputs this packet to the receiving buffer 13R together with the port number "8" of a line interface having received the packet.

Figure 13:
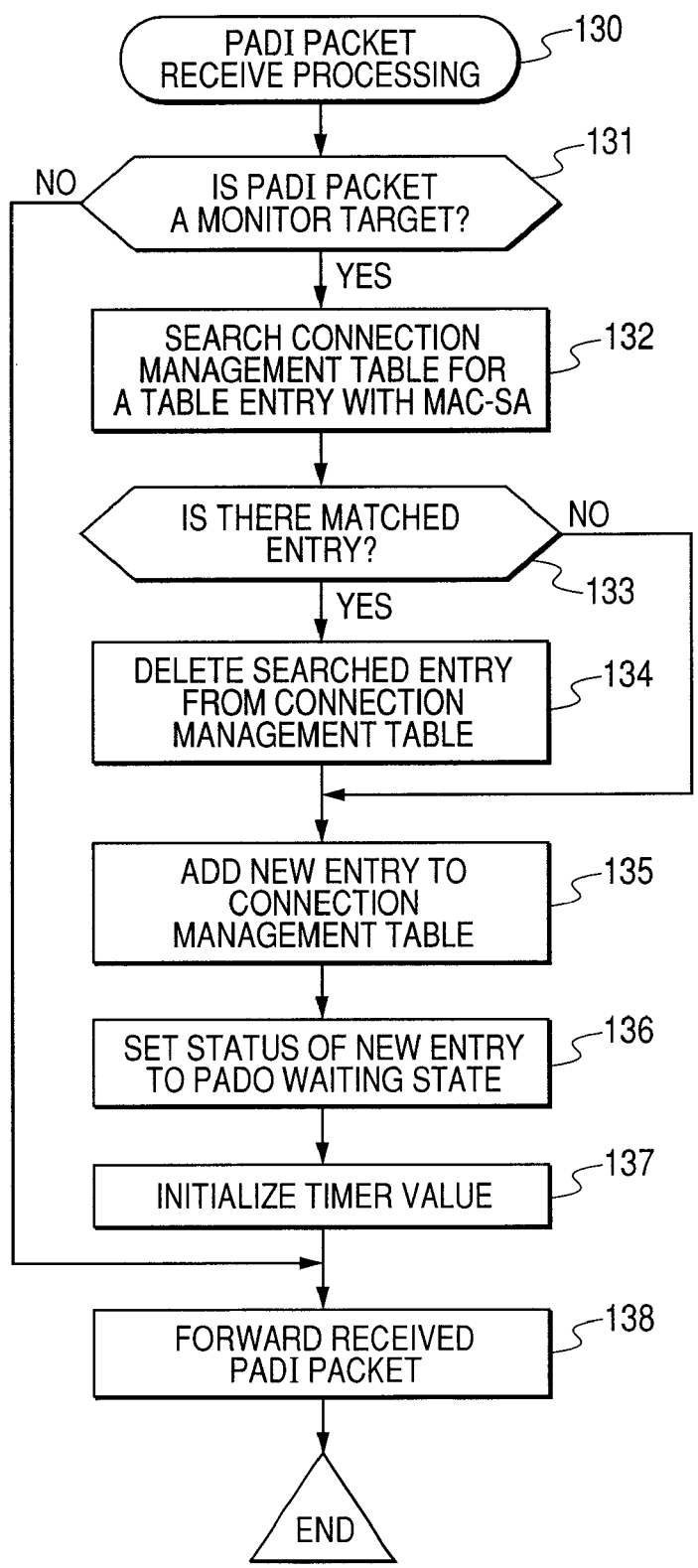
FIG. 13 is a flowchart of a PADI packet receive processing routine 130 to be executed by the GW selector.

When the PADI packet is received, the control processor 14 executes a PADI packet receive processing routine 130 shown in FIG. 13. The PADI packet receive processing routine 130 constitutes a part of the communication control routine 16, together with a PADO packet receive processing routine 140, a PADS packet receive processing routine 150, and a PADT packet receive processing routine 300, which will be described later.

In the PADI packet receive processing routine 130, the control processor 14 determines whether PADI is specified as a monitor target packet (131), by referring to the monitor target packet table 17. If PADI is not specified as a monitor target, the control processor 14 forwards the received PADI packet to the routing unit 12 via the transmitting buffer 13T (138) and exits this routine.

In the present embodiment, it is assumed that PADI is specified as a monitor target. In this case, the control processor 14 searches the connection management table 18 for a table entry including the terminal MAC address 182 matched with the value "00-00-00-00-00-03" of the source MAC address (MAC-SA 902) of the received packet (132).

As a result of the table search (133), if a table entry corresponding to the MAC-SA of the received packet was not found, the control processor 14 registers a new table entry into the connection management table 18 (135). The table entry includes, as illustrated in FIG. 17A, the port number "8" notified from the routing unit 12 as the terminal port 181, and the MAC-SA value "00-00-00-00-00-03" as the terminal MAC 182. The control processor 14 sets the status 185 of the table entry to PADO waiting (136), and initializes the timer value 186 to a predetermined value (137). After that, the control processor 14 forwards the received PADI packet to the routing unit 12 (138) and exits this routine.

As a result of the table search, if a table entry corresponding to the MAC-SA of the received packet was found, the control processor 14 regards the connection request as the one that was retransmitted from the same user. In this case, the control processor 14 executes steps 135 to 138 after deleting the searched table entry from the connection management table 18 (134).

Upon receiving the PADI packet from the control processor 14, the routing unit 12 broadcasts the PADI packet to a plurality of line interfaces connected to the GWs, according to the table entries each having the GW connection flag 192 set to "1" in the port management table 19 (SQ111-1, SQ111-2).

The BASs 20LP-1 and 20LP-2 return PADO packets, respectively, in response to the PADI packet (SQ112-1, SQ112-2). The destination MAC address (MAC-DA 901) of these PADO packets indicates the MAC address "00-00-00-00-00-03" of the PPPoE terminal 40-*m*.

The routing unit 12 of the GW selector 10L-1 outputs the PADO packet received first from the BAS 20LP-1 to the receiving buffer 13R, together with the port number "5" of the line interface having received the packet. The PADO packet received later from the BAS 20LP-2 is also output to the receiving buffer 13R, together with the port number "k" of the line interface having received the packet.

Figure 14:
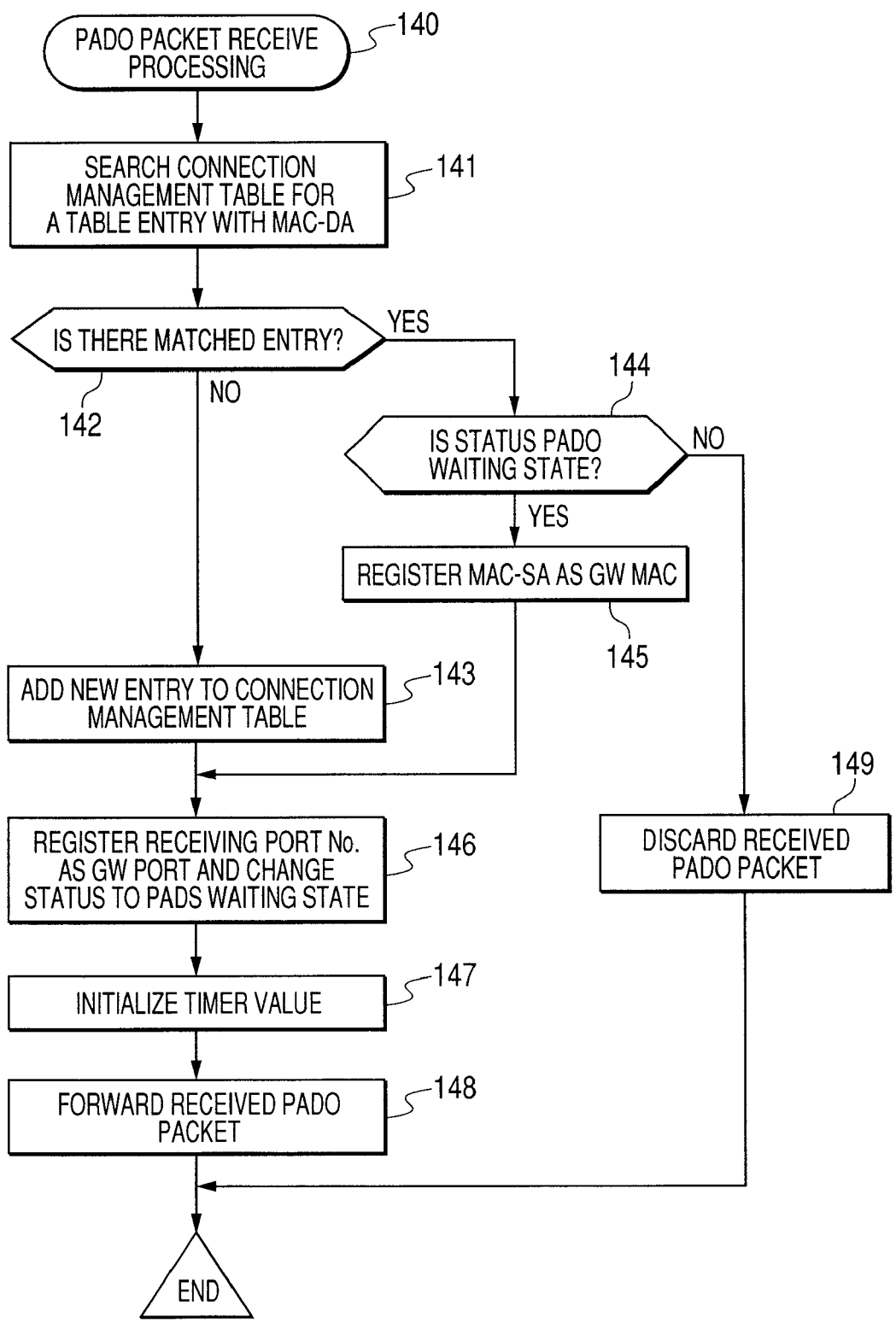
FIG. 14 is a flowchart of a PADO packet receive processing routine 140 to be executed by the GW selector.

Upon receiving the PADO packet transmitted from the BAS 20LP-1, the control processor 14 executes a PADO packet receive processing routine 140 shown in FIG. 14. First, the control processor 14 searches the connection management table 18 for a table entry including the terminal MAC 182 matched with the value "00-00-00-00-00-03" of the destination MAC address (MAC-DA 901) of the received packet (141).

As a result of the table search (142), if a table entry matched with the destination MAC address is found, the control processor 14 determines whether the status 185 of the searched entry is PADO waiting state (144). Because the status 185 is PADO waiting state at this time, the control processor 14 registers, as illustrated in FIG. 17B, the address value "00-00-00-22-22-01" specified by the source MAC address (MAC-SA 902) of the received packet into the GW MAC 184 field of the searched table entry (145), the port number "5" into the GW port 183 field, and changes the status 185 of the searched table entry to PADS waiting (146). After that, the control processor 14 initializes the timer value 186 of the table entry (147), forwards the received packet (PADO) to the routing unit 12 via the transmitting buffer 13T (148), and exits this routine.

Upon receiving the PADO packet from the control processor 14, the routing unit 12 refers to the port management table 19 based on the destination MAC address (MAC-DA 901) of the received packet. In this case, as shown in FIG. 7, the port management table 19 indicates the port number "8" for connection to the PPPoE terminal 40-*m* by the port number 191 field corresponding to the MAC address "00-00-00-00-00-03". Thus, the routing unit 12 transmits the received PADO packet through the line interface having the port number "8" (SQ113).

If PADI is not specified as a monitor target packet, registering the table entry having the terminal MAC address "00-00-00-00-00-03" into the connection management table 18 is not performed in the PADI packet receive processing 130 described by referring to FIG. 13. In this case, since the control processor 14 fails in searching a table entry from the connection management table (142), the control processor 14 creates a new table entry including the value "00-00-00-00-00-03" of the destination MAC address (MAC-DA 901) of the received packet in the terminal MAC 182 field and the value "00-00-00-22-22-01" of the source MAC address (MAC-SA 902) in the GW MAC 184 field. In the terminal port 181 field of the table entry, the port number "8" corresponding to the destination MAC address "00-00-00-00-00-03" retrieved from the port management table 19 is set, but this port number value may be omitted. After registering the new table entry into the connection management table 18 (143), the control processor 14 executes steps 146 to 148.

The control processor 14 also executes the PADO receive processing routine 140 when a PADO packet is received from the BAS 20LP-2. The control processor 14 searches the connection management table 18 for a table entry including the terminal MAC 182 matched with the value "00-00-00-00-00-03" of the destination MAC address (MAC-DA 901) of the received packet (141). In the table entry retrieved this time, as illustrated in FIG. 17B, the status 185 has already been changed to PADS waiting. From the result of status check (144), therefore, the control processor 14 regards the PADO packet received this time as the one that was transmitted from another one of redundant BASs, discards the received packet (149), and exits this routine.

Upon receiving the PADO packet, the PPPoE terminal 40-*m* transmits a PADR packet to the BAS 20LP-1 which is the source of the PADO packet (SQ114). In the present embodiment, the PADR packet is excluded from monitor targets in the GW selector 10L-1 because the status 185 is in a PADS waiting state in the connection management table 18 as shown in FIG. 17B. That is, the GW selector waits for receiving PADS to be replied in response to PADR. In this case, the control processor 14 of the GW selector 10L-1 immediately transfers the PADR packet to the routing unit 12 after receiving it.

Upon receiving the PADR packet, the routing unit 12 routes the received packet according to the port management table 19. The destination MAC address (MAC-DA 901) of the PADR packet indicates the MAC address "00-00-00-22-22-01" of the BAS 20LP-1. In the port management table 19, the port number "5" assigned to the connection line for connecting with the BAS 20LP-1 is stored in association with the above MAC address. Therefore, the PADR packet is forwarded from the GW selector 10L-1 to the BAS 20LP-1 (SQ115).

The BAS 20LP-1 returns a PADS packet in response to the PADR (SQ116). Upon receiving the PADS packet, the routing unit 12 of the GW selector 10L-1 outputs the packet to the receiving buffer 13R, together with the port number "5" of the line interface having received the packet.

Figure 15:
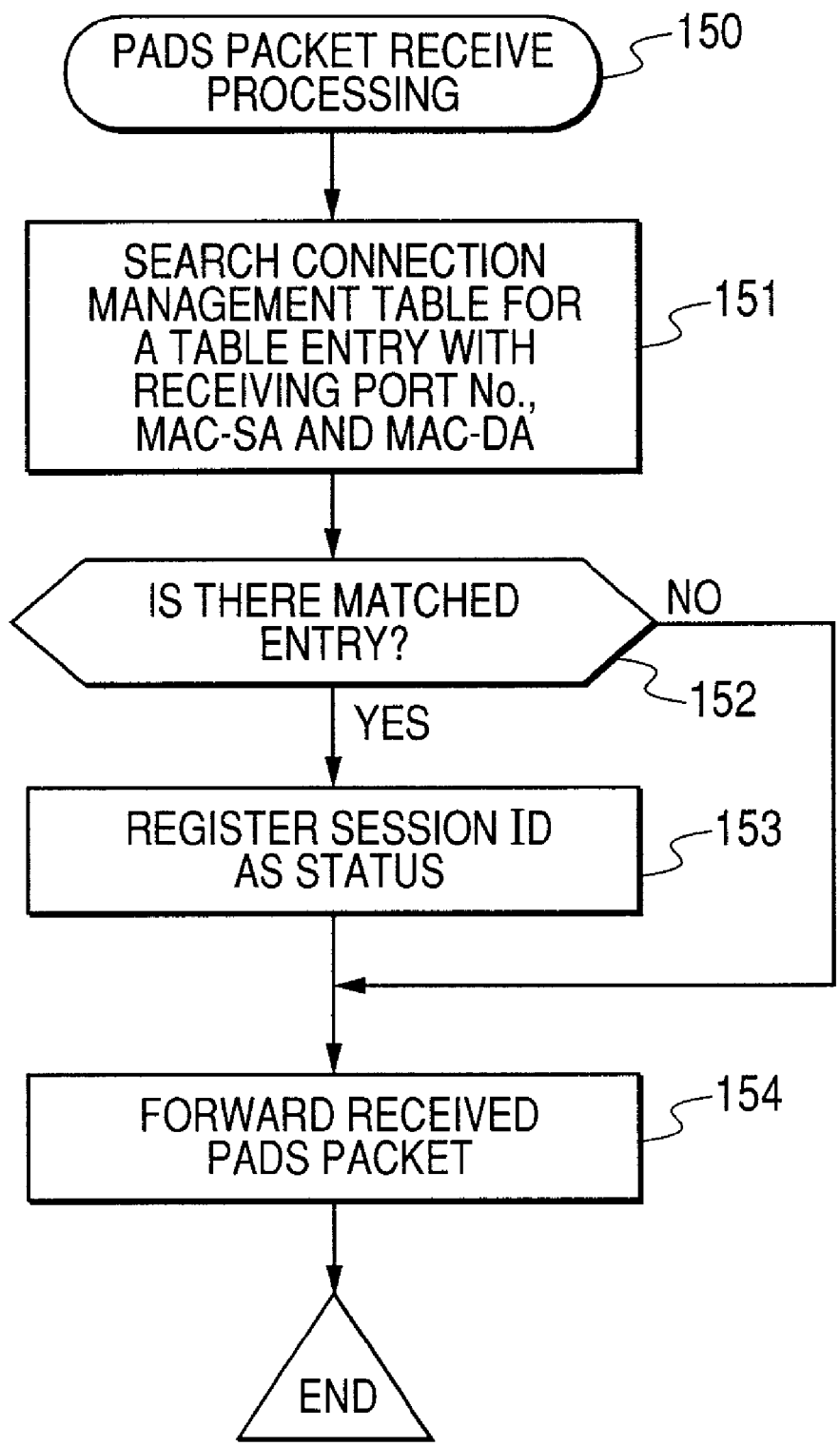
FIG. 15 is a flowchart of a PADS packet receive processing routine 150 to be executed by the GW selector.

When the PADS packet is received, the control processor 14 executes a PADS packet receive processing routine 150 shown in FIG. 15. In the PADS packet receive processing routine 150, the control processor 14 searches the connection management table 18, using a search key including the port number "5" notified from the routing unit 12, and the destination MAC address "00-00-00-00-00-03" (MAC-DA 901) and the source MAC address "00-00-00-22-22-01" (MAC-SA 902) of the received packet, for a table entry having the GW port 183, terminal MAC 182, and GW MAC 184 matched with the search key (151).

As a result of the table search (152), if a table entry matched with the search key is found, the control processor 14 sets the value of session ID ("10" in this example) specified in the received PADS packet into the status 185 field of the searched table entry (153), as illustrated in FIG. 17C, transfers the PADS to the routing unit 12 via the transmitting buffer 13T (154), and exits this routine.

Because the destination address (MAC-DA 901) of the above PADS packet is "00-00-00-00-00-03", the routing unit 12 forwards the PADS packet to a line interface of a port number "8" designated by the port management table 19 shown in FIG. 7. Thereby, the PADS packet is transmitted to the PPPoE terminal-m (SQ117).

If the connection management table 18 has no table entry matched with the search key, the control processor 14 forwards the received PADS to the routing unit 12 (154) and exits this routine. This event occurs in such a case that, for example, the table entry corresponding to the search key has been deleted automatically by the timer monitoring routine.

When the PPPoE terminal receives the PADS packet, the communication phase for the PPPoE terminal 40-*m* transits from the PPPoE connection phase SP1 to a PPPoE forwarding phase SP2. During the PPPoE forwarding phase SP2, the GW selector 10L-1 carries out forwarding of PPPoE packets between the PPPoE terminal 40-*m* and the BAS 20LP-1 (SQ200) and Keepalive packets to be communicated between the PPPoE terminal 40-*m* and the BAS 20LP-1 (SQ210 to 213).

During the PPPoE forwarding phase SP2, the BAS 20LP-1 forwards PPPoE packets received from the PPPoE terminal 40-*m* via the GW selector 10L-1 to the router 24 and forwards PPPoE packets received from the router via the GW selector 10L-1 to the PPPoE terminal 40-*m* (SQ201). The BAS 20LP-1 makes sure of the operating state of the PPPoE terminal 40-*m* by issuing a Keepalive request periodically (SQ210) and by receiving a response packet (Keepalive acknowledge) from the terminal.

When the terminal user terminates the access to the Internet, a connection termination packet PADT addressed to the BAS 20LP-1 is transmitted from the PPPoE terminal 40-*m* (SQ310) and the communication phase for the PPPoE terminal 40-*m* transits from the PPPoE forwarding phase SP2 to a PPPoE disconnection phase SP3. Upon receiving the PADT packet, the routing unit 12 of the GW selector 10L-1 outputs the packet to the receiving buffer 13R, together with a port number "8" of the line interface having received the packet.

Figure 16:
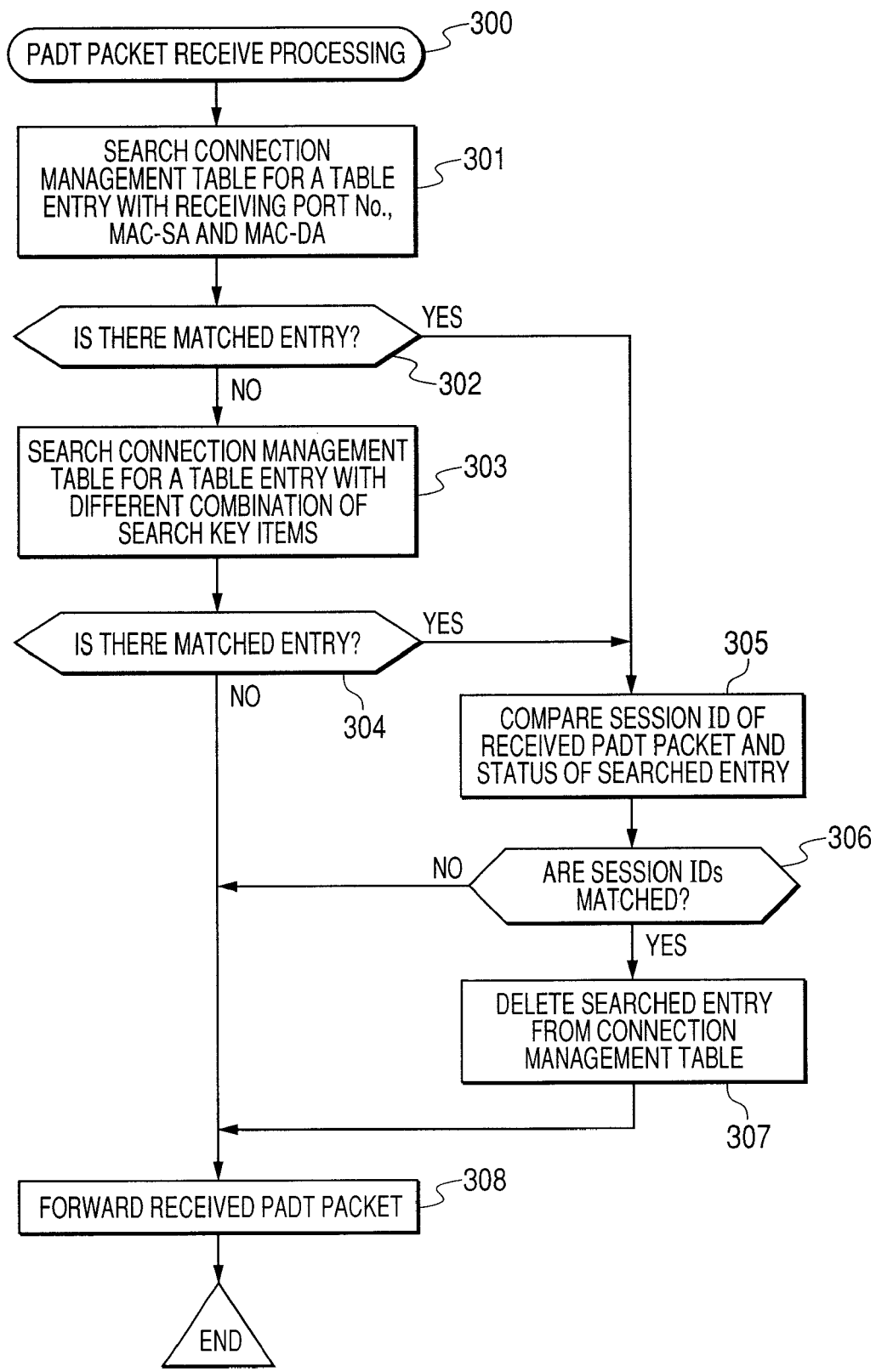
FIG. 16 is a flowchart of a PADT packet receive processing routine 300 to be executed by the GW selector.

Upon receiving the PADT packet, the control processor 14 executes a PADT packet receive processing routine 300 shown in FIG. 16. In the PADT packet receive processing routine 300, the control processor 14 searches the connection management table 18, using a search key including the port number "8" and the source MAC address "00-00-00-00-00-03" (MAC-SA 902) and the destination MAC address "00-00-00-22-22-01" (MAC-DA 901) of the received packet, for a table entry including the terminal port 181, terminal MAC 182 and GW MAC 184 matched with the search key (301). The port number may be excluded from the search key.

As a result of the table search (302), if a table entry matched with the search key is found, the control processor 14 judges whether the value of the session ID indicated in the status 185 of the searched table entry matches with the session ID value "10" specified in the session ID 922 field of the received PADT packet (305). If it was determined that the two session IDs match with each other as the result of the judging (306), the control processor 14 deletes the searched table entry from the connection management table 18 (307), forwards the received packet to the routing unit 12 via the transmitting buffer 13T (308), and exits this routine.

Upon receiving the PADT packet from the control processor 14, the routing unit 12 specifies the port number 191 for outputting the packet by referring to the port management table 19 and forwards the PADT packet to the BAS 20LP-1 (SQ311).

In a case where PADT packet is issued from the BAS 20LP-1 side, it is found that the connection management table 18 has no table entry looked for in the judging step 302. In this case, the control processor 14 changes the combination of the search key items and searches the connection management table 18, using a search key including the destination MAC address "00-00-00-00-00-03" (MAC-DA 901) of the received packet, port number "5", and source MAC address "00-00-00-22-22-01" (MAC-SA 902) of the received packet, for a table entry including the terminal MAC 182, GW port 183, and GW MAC 184 matched with the search key (303).

As a result of the table search (304), if a table entry looked for was found, the control processor 14 executes the foregoing steps 305 to 308. If a table entry looked for was not found, the processor executes step 308 and exits this routine.

As can be appreciated from the above description, according to the present embodiment, even when a plurality of GWs (BASs) respond to a connection initiation request broadcasted from the PPPoE terminal 40, the packet forwarding apparatus (GW selector) 10 validates a response from a particular GW and invalidates responses from the other GWs, so that the PPPoE terminal 40 can carry out the subsequent communication control procedure with the particular BAS. Accordingly, redundant BAS configuration can be realized independently of implementation on the PPPoE terminal 40.

While GW selection is performed by the control processor 14 in the above-described embodiment, the function of the control processor 14 described in the embodiment may be implemented on the routing unit 12, if it poses no problem in the processing performance of the routing unit 12. The connection control table 18 may include both table entries for IEEE 802.1X (EAPOL) illustrated in FIG. 6 and table entries for PPPoE illustrated in FIG. 17 in a coexistence manner While the described embodiment illustrates an implementation of the invention in the communication network topology that makes connectable a group of terminals operating with IEEE 802.1X and a group of terminals operating with PPPoE to the same layer-2 access network by deploying packet forwarding apparatuses (GW selectors) having the functionality of processing both the EAPOL protocol and PPPoE protocol in the access network, the scope of application of the invention can be further extended by increasing the types of communication protocols that the packet forwarding apparatus (GW selectors) can process. For example, by providing the packet forwarding apparatus (GW selectors) with a control function of forwarding DHCP packets, even when a user terminal broadcasts an IP address assignment request, it is possible to selectively enable one of DHCP servers that returned responses to the request to communicate with the user terminal.

What is claimed is:

1. A packet forwarding apparatus to be located in an access network and connected between a plurality of user terminals and a plurality of redundant gateways each connected to an Internet transit network, the packet forwarding apparatus comprising:

a plurality of line interfaces each for communicating with one of said user terminals or one of said gateways; and a protocol processing unit for controlling packet forwarding among said line interfaces and for forwarding, upon receiving a connection initiation request packet having a header including one of a broadcast address and a multicast address as its destination address and transmitted from one of said user terminals to connect the user terminal to the Internet transit network, the connection initiation request packet to said plurality of gateways, said protocol processing unit having a management table for storing forwarding control information to control forwarding of communication control packets, in association with an identifier of each user terminal, wherein said protocol processing unit selects one of response packets replied from said plurality of gateways in response to the connection initiation request packet, forwards the selected response packet to the user terminal from which the connection initiation request packet has been transmitted, and updates said management table so that the other response packets received thereafter are discarded based on the forwarding control information corresponding to the user terminal, wherein said management table comprises a plurality of table entries each indicating the correspondence of an address of one of said user terminals, from which said connection initiation request packet was transmitted, to status information indicating the type of a communication control packet in a reception waiting state, and said protocol processing unit operates to add a new table entry into said management table when a new connection initiation request packet was received from one of said user terminals, said new table entry including an address of the user terminal, as said user terminal identifier, extracted from the header of the received connection initiation request packet and status information indicating that a response packet to the connection initiation request is in a reception waiting state; to judge when a response packet to the connection initiation request packet was received, whether the received response packet should be forwarded to the user terminal or discarded based on the status information in a table entry that includes the user terminal address matched with a destination address in the header of the received response packet; and to change the status information to a reception waiting state of another communication control packet determined depending on a communication control procedure when the received response packet is forwarded to the user terminal so that a response packet received thereafter is discarded by reason of a difference in the type from the communication control packet in the reception waiting state.

2. A packet forwarding apparatus to be located in an access network and connected between a plurality of user terminals and a plurality of redundant gateways each connected to an Internet transit network, the packet forwarding apparatus comprising:

a plurality of line interfaces each for communicating with one of said user terminals or one of said gateways; and a protocol processing unit for controlling packet forwarding among said line interfaces and for forwarding, upon receiving a connection initiation request packet having a header including one of a broadcast address and a multicast address as its destination address and transmitted from one of said user terminals to connect the user terminal to the Internet transit network, the connection initiation request packet to said plurality of gateways, said protocol processing unit having a management table for storing forwarding control information to control forwarding of communication control packets, in association with an identifier of each user terminal, wherein said protocol processing unit selects one of response packets replied from said plurality of gateways in response to the connection initiation request packet, forwards the selected response packet to the user terminal from which the connection initiation request packet has been transmitted, and updates said management table so that the other response packets received thereafter are discarded based on the forwarding control information corresponding to the user terminal, wherein said management table comprises a plurality of table entries, each indicating the correspondence of an address of one of said user terminals, from which said connection initiation request packet was transmitted, to status information indicating the type of a communication control packet in a reception waiting state, and said protocol processing unit operates to search said management table for a table entry when a response packet to said connection initiation request packet was received, the table entry to be searched including the user terminal address matched with a destination address in the header of the received response packet; to add a new table entry into said management table when no table entry corresponding to the destination address was searched, the new table entry including the destination address extracted from the header of the received response packet and status information indicating a reception waiting state of another control packet determined depending on a communication control procedure; and to judge when a table entry corresponding to the destination address was searched, whether the received response packet should be forwarded to said user terminal or discarded based on the status information in the searched table entry.

3. The packet forwarding apparatus according to claim 1, wherein said protocol processing unit sets a timer for detecting expiration of a predetermined timer value in each table entry of said management table, initializes the timer each time the status information of the table entry is updated in conjunction with the receiving of a communication control packet, and automatically erases the table entry from the management table when expiration of the timer value is detected so that a communication control packet having been in the reception waiting state is discarded if the communication control packet is received after the table entry is erased.

4. The packet forwarding apparatus according to claim 1, wherein said protocol processing unit is provided with a monitor target packet table for previously designating the type of communication control packets to be monitored, and the protocol processing unit performs forwarding control of a communication control packet received through one of said line interfaces based on the forwarding control information searched from said management table if the received packet is designated as one of communication control packets to be monitored in said monitor target packet table, and routes the received packet to one of the other line interfaces according to its header information if the received packet is not designated in said monitor target packet table.

5. The packet forwarding apparatus according to claim 1, wherein said protocol processing unit comprises a routing unit connected to said plurality of line interfaces and a control processor connected to the routing unit to control forwarding of communication control packets according to said management table, wherein said routing unit forwards communication control packets received through said line interfaces to said control processor and routes communication control packets received from the control processor and user packets received through each of said line interfaces to any of the line interfaces in accordance with the header information of each packet.

6. The packet forwarding apparatus according to claim 5, wherein said routing unit selectively forwards each of communication control packets, designated by said monitor target packet table and selected from among communication control packets received through each of said line interfaces, to said control processor and routes each of the other communication control packets not designated by said monitor target packet table, communication control packets received from the control processor, and each of user packets received through each of said line interfaces to any one of the line interfaces selectively in accordance with the header information of each packet.

7. The packet forwarding apparatus according to claim 5, wherein said routing unit is provided with a port management table for indicating the identifiers of line interfaces each connected to one of said gateways and routes the connection initiation request to each of said plurality of line interfaces having the identifiers designated by the port management table.

8. The packet forwarding apparatus according to claim 1, wherein said protocol processing unit controls forwarding of plural types of connection initiation requests conforming to different communication protocols in accordance with the forwarding control information designated by said management table.

9. The packet forwarding apparatus according to claim 1, wherein at least one of said line interfaces is connected to a plurality of user terminals via a passive optical network.

10. The packet forwarding apparatus according to claim 1, wherein at least one of said line interfaces communicates with a plurality of user terminals via a wireless network.

* * * * *